United States Patent
Poghosyan et al.

(10) Patent No.: US 10,901,869 B2
(45) Date of Patent: Jan. 26, 2021

(54) METHODS AND SYSTEMS THAT EFFICIENTLY STORE METRIC DATA

(71) Applicant: VMware, Inc., Palo Alto, CA (US)

(72) Inventors: Arnak Poghosyan, Yerevan (AM); Ashot Nshan Harutyunyan, Yerevan (AM); Naira Movses Grigoryan, Yerevan (AM); Vaghinak Saghatelyan, Yerevan (AM); Vahe Khachikyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 193 days.

(21) Appl. No.: 15/805,424

(22) Filed: Nov. 7, 2017

(65) Prior Publication Data

US 2019/0138419 A1    May 9, 2019

(51) Int. Cl.
*G06F 11/30* (2006.01)
*G06F 11/34* (2006.01)

(52) U.S. Cl.
CPC ........ *G06F 11/3082* (2013.01); *G06F 11/301* (2013.01); *G06F 11/3006* (2013.01); *G06F 11/3452* (2013.01); *G06F 2201/815* (2013.01)

(58) Field of Classification Search
CPC .. H04N 19/124; H04N 19/154; H04N 19/463; H04N 19/63; H04N 17/004; H04N 19/11; H04N 19/117; H04N 19/119; H04N 19/132; H04N 19/156; H04N 19/162; H04N 19/172; H04N 19/176; H04L 47/2416; H04L 47/2433; H04L 47/283; H04L 47/70
See application file for complete search history.

(56) References Cited

U.S. PATENT DOCUMENTS

| 7,337,206 B1* | 2/2008 | Wen | H04L 43/00 370/235 |
|---|---|---|---|
| 9,282,329 B2* | 3/2016 | He | H04N 19/176 |
| 2006/0242706 A1* | 10/2006 | Ross | G06F 21/55 726/23 |
| 2010/0205131 A1* | 8/2010 | Kumar | G06F 15/173 706/46 |
| 2012/0078894 A1* | 3/2012 | Jiang | G06K 9/00758 707/723 |
| 2014/0059037 A1* | 2/2014 | Swaminathan | G06F 16/51 707/713 |
| 2014/0128102 A1* | 5/2014 | Finlow-Bates | H04W 4/029 455/456.3 |
| 2014/0212027 A1* | 7/2014 | Hallquist | G06F 3/1415 382/154 |

(Continued)

*Primary Examiner* — Ninos Donabed

(57) ABSTRACT

The current document is directed to methods and systems that collect metric data within computing facilities, including large data centers and cloud-computing facilities. In a described implementation, lower and higher metric-data-value thresholds are used to partition collected metric data into outlying metric data and inlying metric data. The inlying metric data is quantized to compress the inlying metric data and adjacent data points having the same quantized metric-data values are eliminated, to further compress the inlying metric data. The resulting compressed data includes original metric-data representations for outlier data points and compressed metric-data representations for inlier data points, providing accurate restored metric-data values for significant data points when compressed metric data is decompressed.

5 Claims, 32 Drawing Sheets

(56) References Cited

U.S. PATENT DOCUMENTS

| | | | |
|---|---|---|---|
| 2014/0307781 A1* | 10/2014 | He | H04N 19/176 |
| | | | 375/240.03 |
| 2015/0134704 A1* | 5/2015 | Wallis | G06F 16/901 |
| | | | 707/803 |
| 2016/0086030 A1* | 3/2016 | Gottemukkula | G06K 9/0061 |
| | | | 382/117 |
| 2017/0055913 A1* | 3/2017 | Bandyopadhyay | A61B 5/0402 |
| 2018/0137224 A1* | 5/2018 | Hemmer | G06F 3/0673 |
| 2018/0365298 A1* | 12/2018 | Poghosyan | H03M 7/00 |
| 2019/0076126 A1* | 3/2019 | Greenleaf | A61B 8/463 |

* cited by examiner $n$ – number of quantization levels — 2245
sizeof($T$) — 2246
sizeof($V$) — 2247
sizeof($I$) — 2248
sizeof($V$) — 2249
$C_0, C_1, \ldots, C_n$ – quantization thresholds — 2250
$m_1, m_2, \ldots, m_n$ – quantization – level values — 2252

2253 — int $L, H, Q$ – number of low and high outliers and quantized metric values
2254 — numEntries – number of metric values received
2255 — phase
2256 — filePtr - Files[ ]
2257 — int – hFile, lFile, qFile, aFile, bFile, cFile, dFile, ...
2258 — T/V last_d ns similar to that shown in FIG. 1.
METHODS AND SYSTEMS THAT EFFICIENTLY STORE METRIC DATA

TECHNICAL FIELD

The current document is directed to computer-system monitoring and management and, in particular, to collection, generation, and storage of metric data used for monitoring, management, and administration of computer systems.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system monitoring, management, and administration. Currently, these needs have begun to be addressed by highly capable automated data-collection, data analysis, monitoring, management, and administration tools and facilities. Many different types of automated monitoring, management, and administration facilities have emerged, providing many different products with overlapping functionalities, but each also providing unique functionalities and capabilities. Owners, managers, and users of large-scale computer systems continue to seek methods, systems, and technologies to provide secure, efficient, and cost-effective data-collection and data analysis tools and subsystems to support monitoring, management, and administration of computing facilities, including cloud-computing facilities and other large-scale computer systems.

SUMMARY

The current document is directed to methods and systems that collect metric data within computing facilities, including large data centers and cloud-computing facilities. In a described implementation, lower and higher metric-data-value thresholds are used to partition collected metric data into outlying metric data and inlying metric data. The inlying metric data is quantized to compress the inlying metric data and adjacent data points having the same quantized metric-data values are eliminated, to further compress the inlying metric data. The resulting compressed data includes original metric-data representations for outlier data points and compressed metric-data representations for inlier data points, providing accurate restored metric-data values for significant data points when compressed metric data is decompressed.

DETAILED DESCRIPTION

Figure 1:
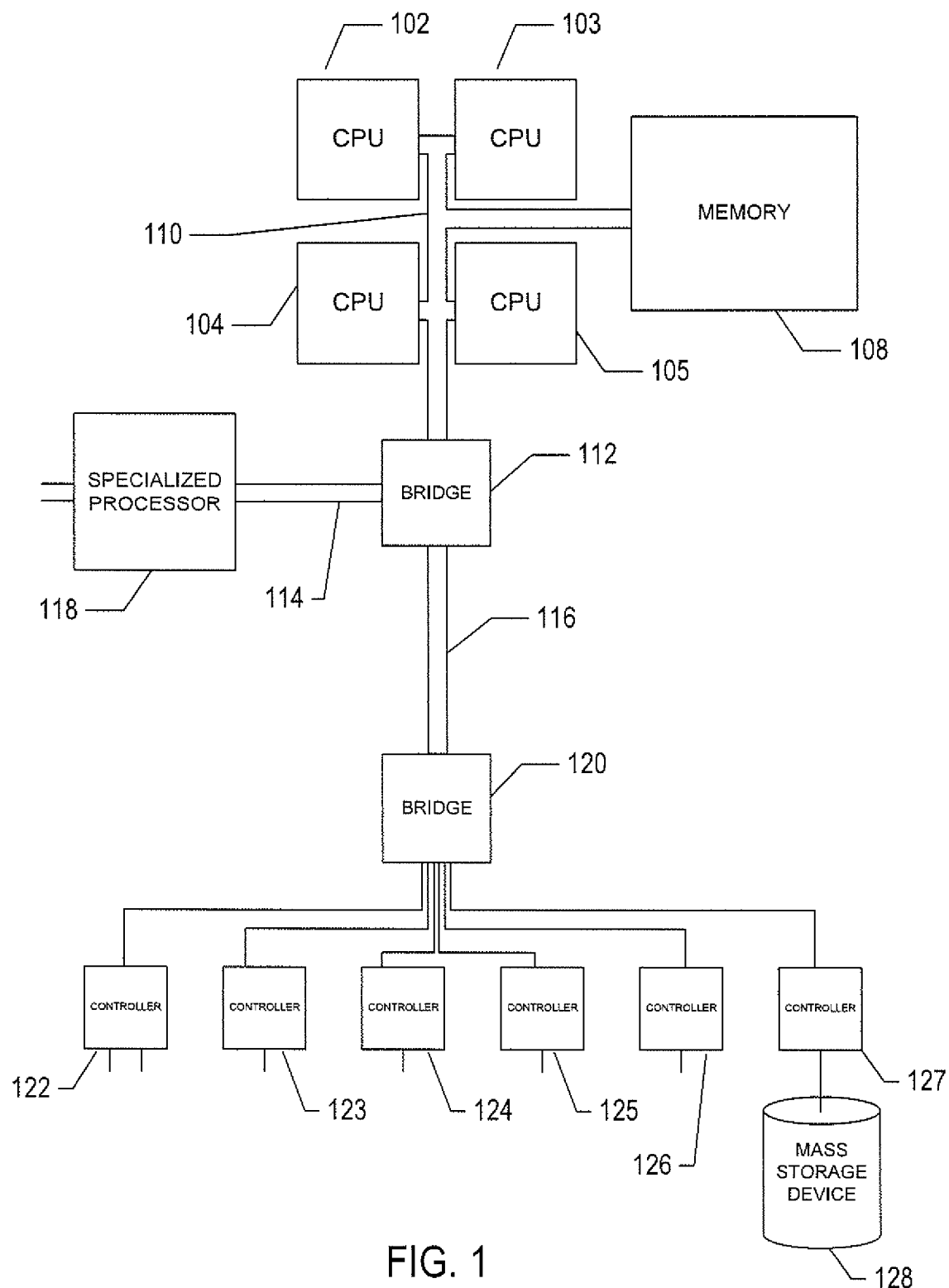
FIG. 1 provides a general architectural diagram for various types of computers.

The current document is directed to methods and systems that collect metric data within computing facilities, including large data centers and cloud-computing facilities, that compress the metric-data for efficient storage, and that subsequently decompress the compressed multidimensional metric-data for analysis and for management and administration purposes. In a first subsection, below, a detailed description of computer hardware, complex computational systems, and virtualization is provided with reference to FIGS. 1-10. In a second subsection, the currently disclosed methods and systems for collecting and exporting performance data are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
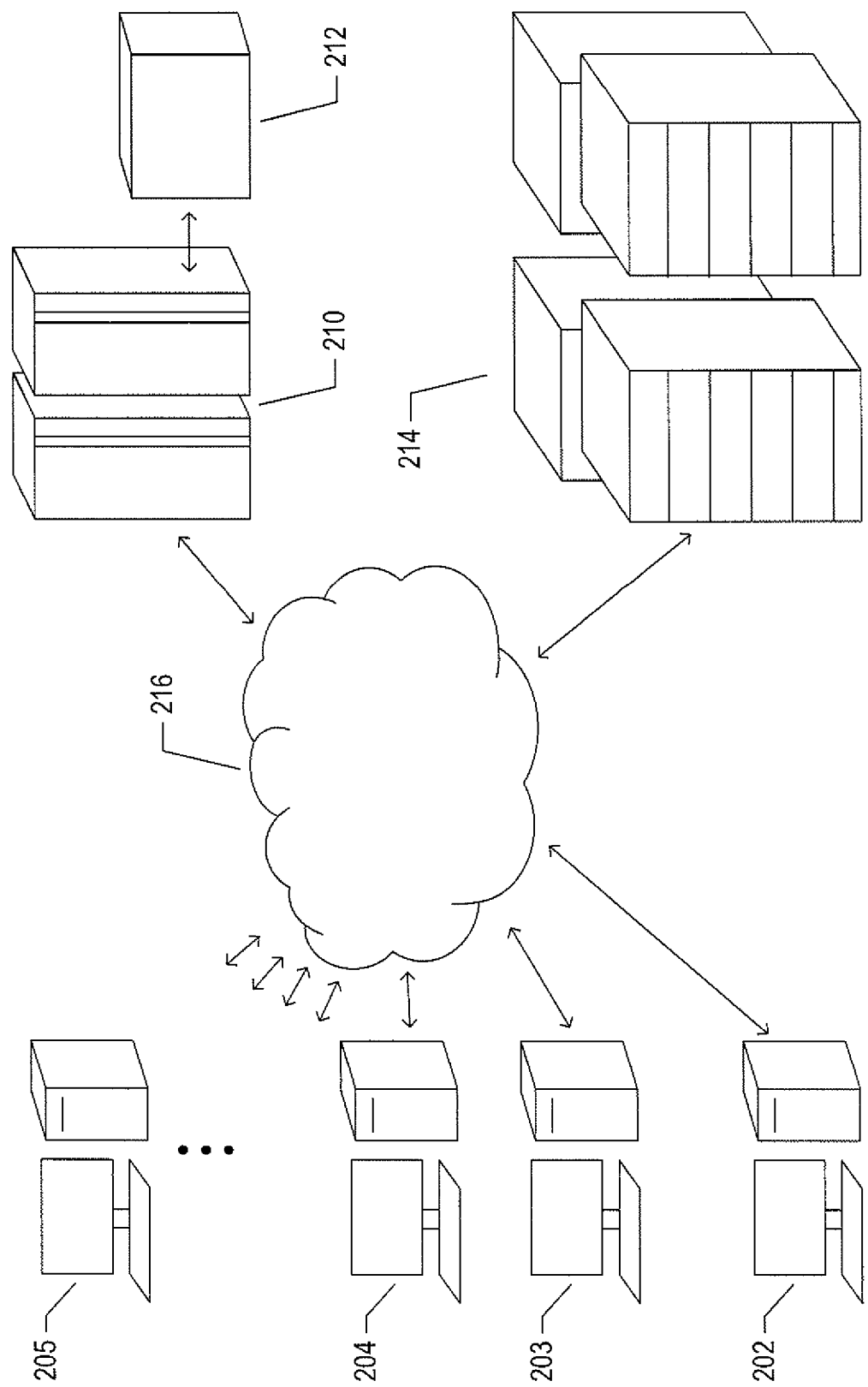
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
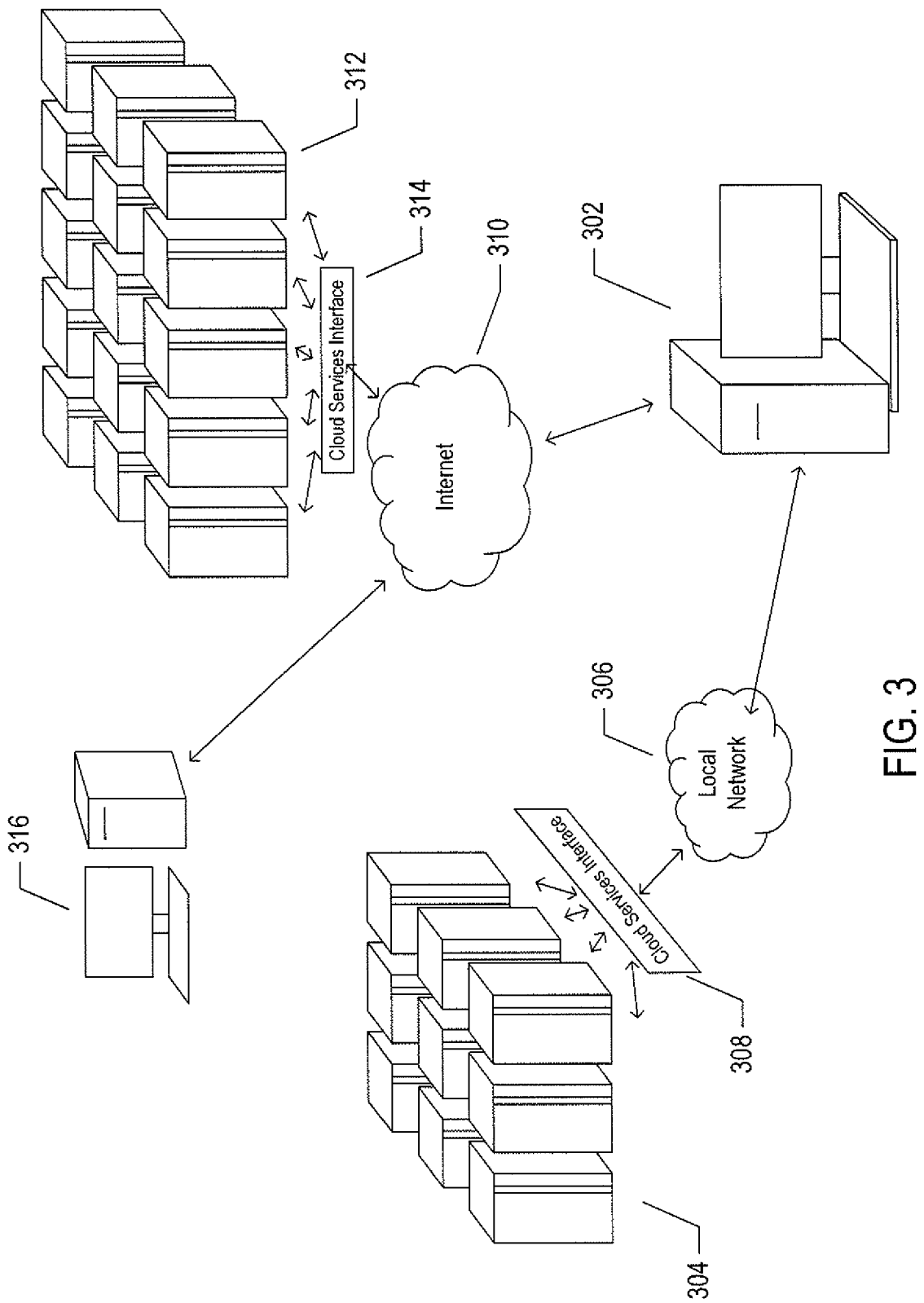
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
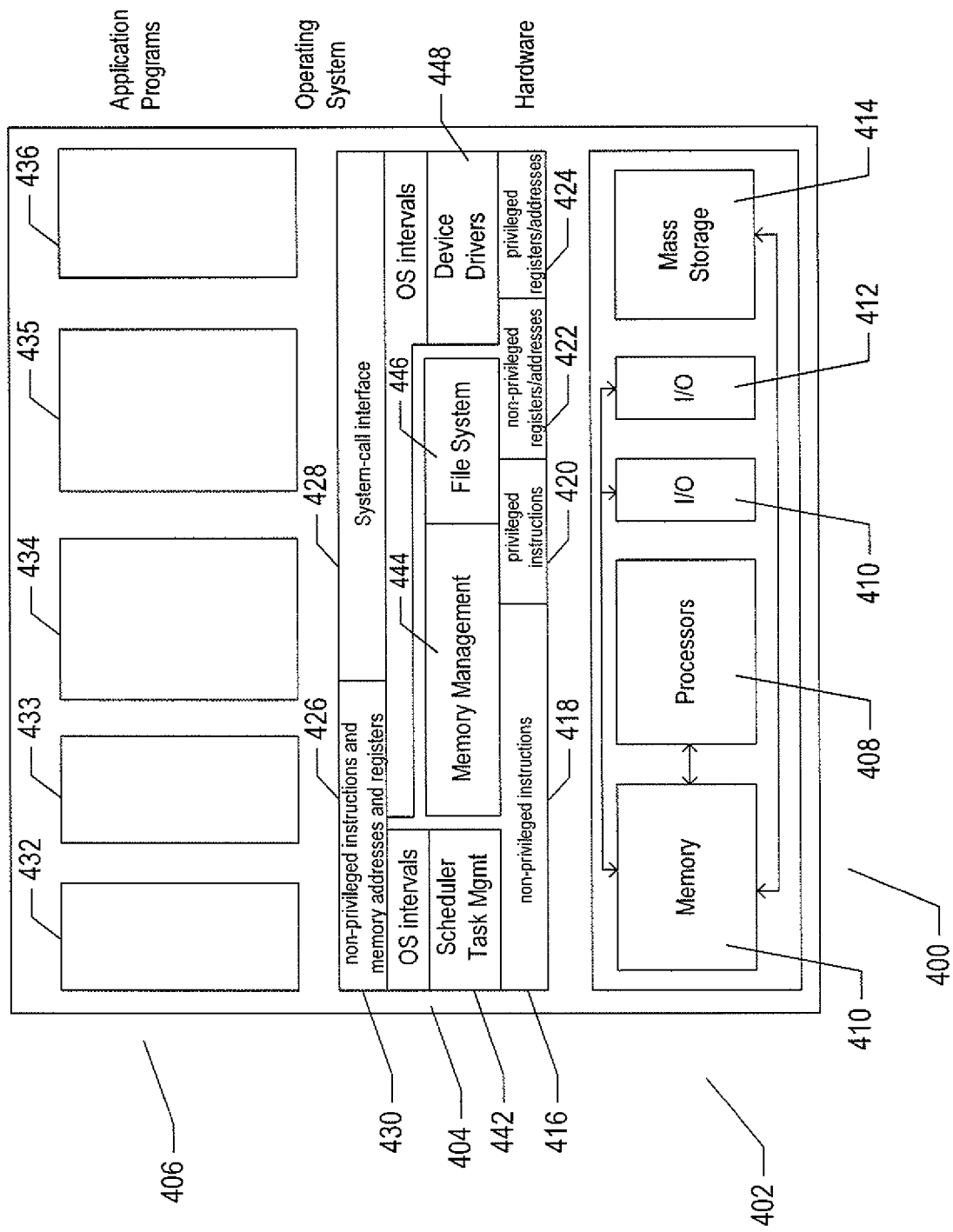
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
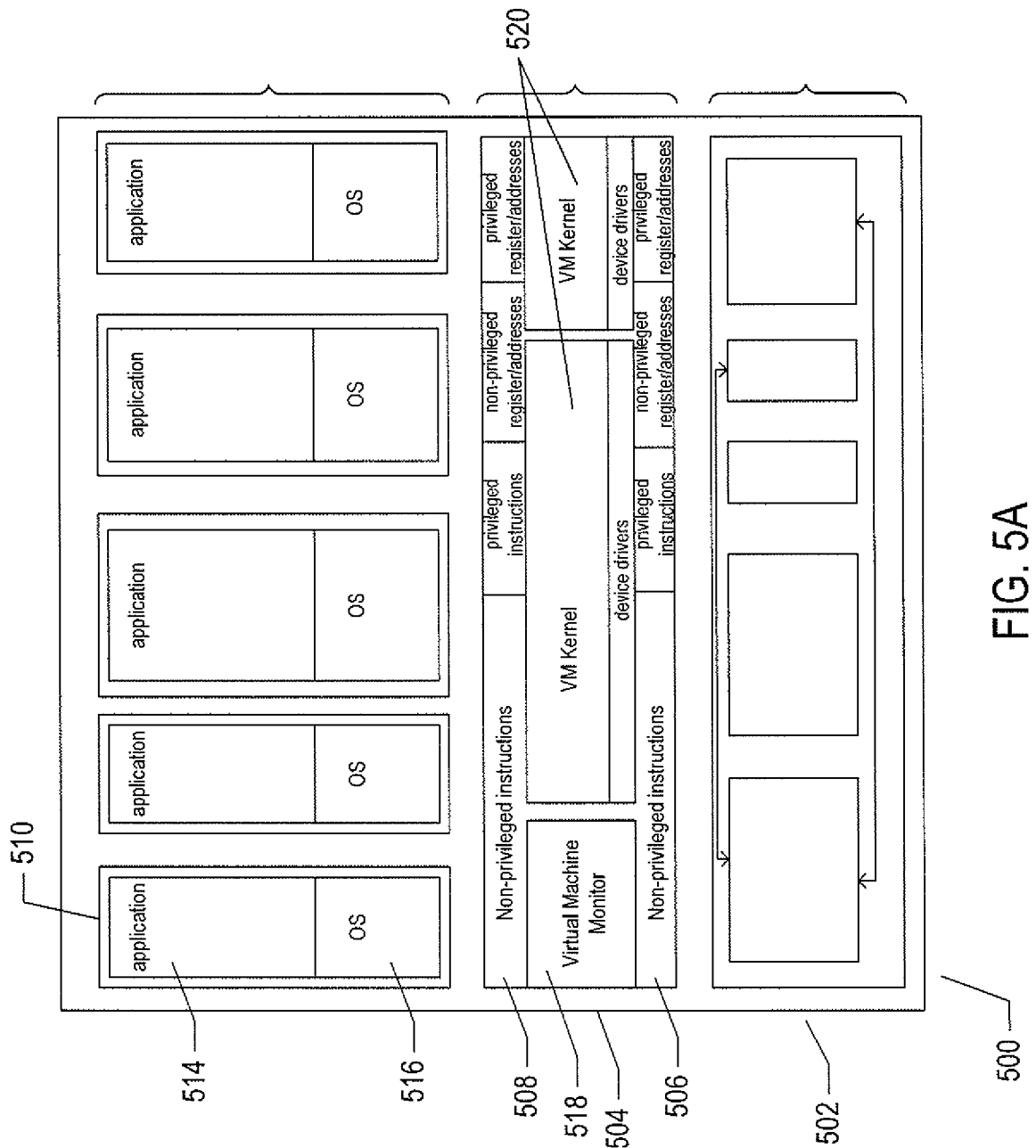
FIGS. 5A-D illustrate two types of virtual machine and virtual-machine execution environments.
Figure 5B:
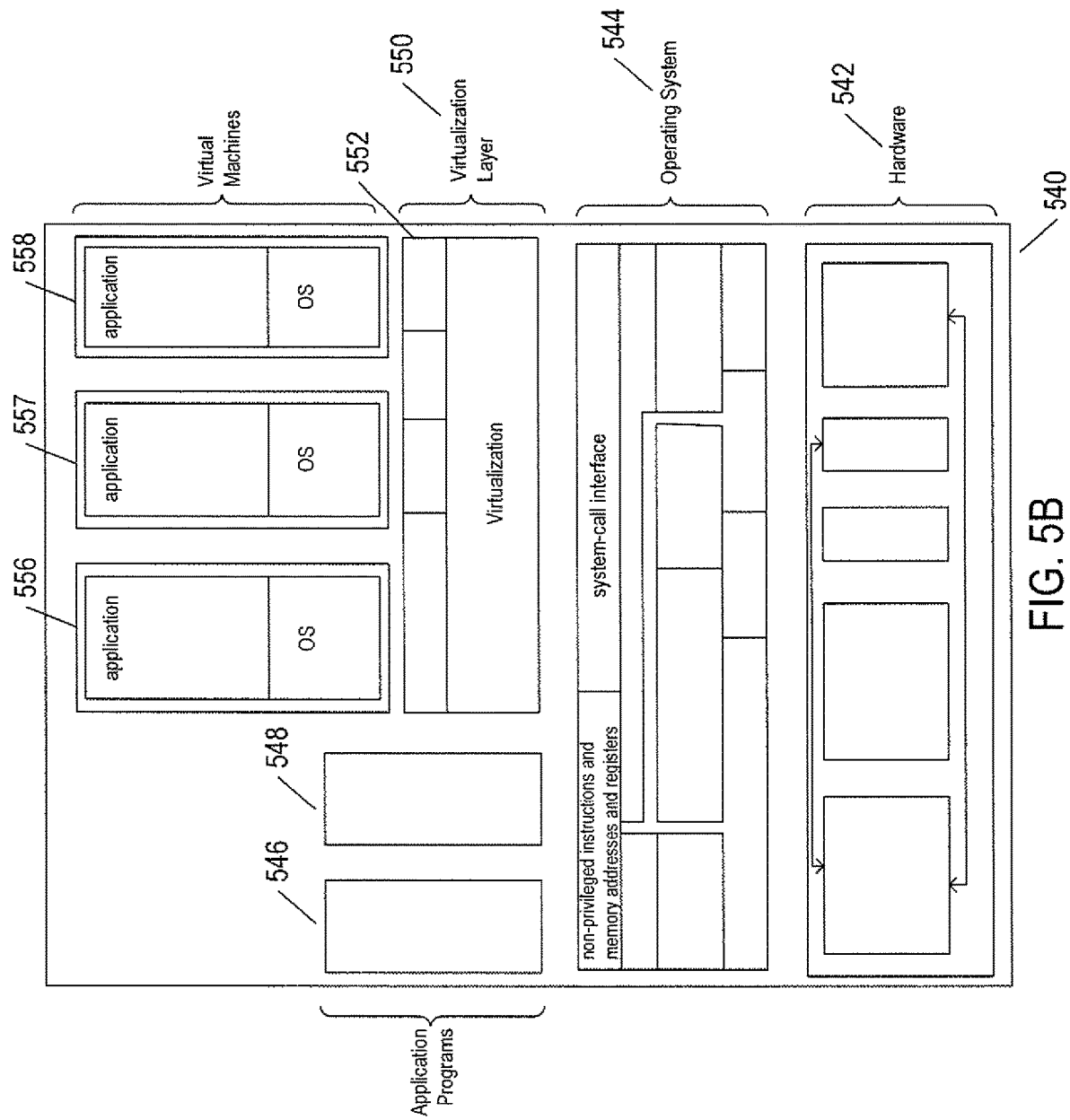

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
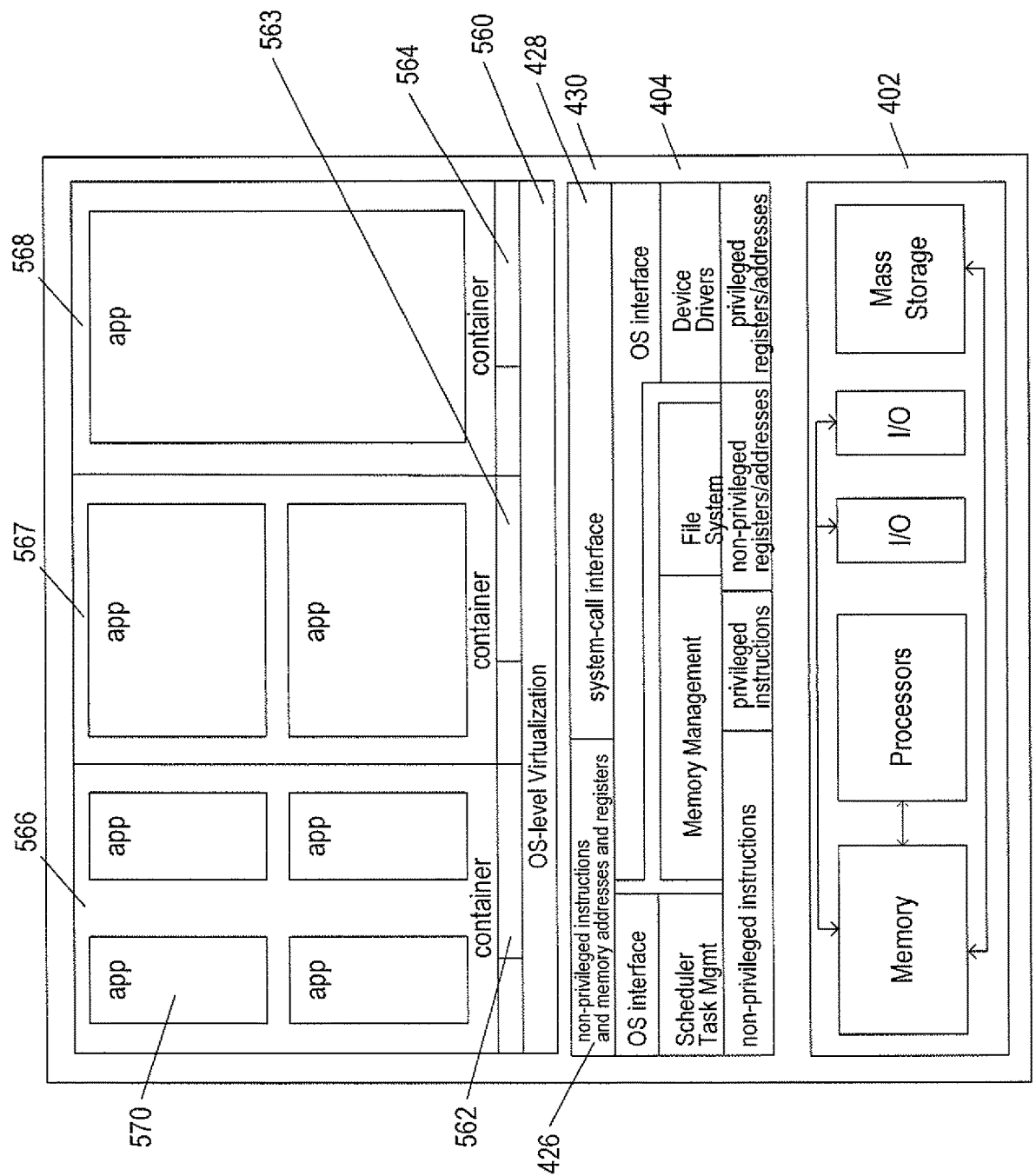

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
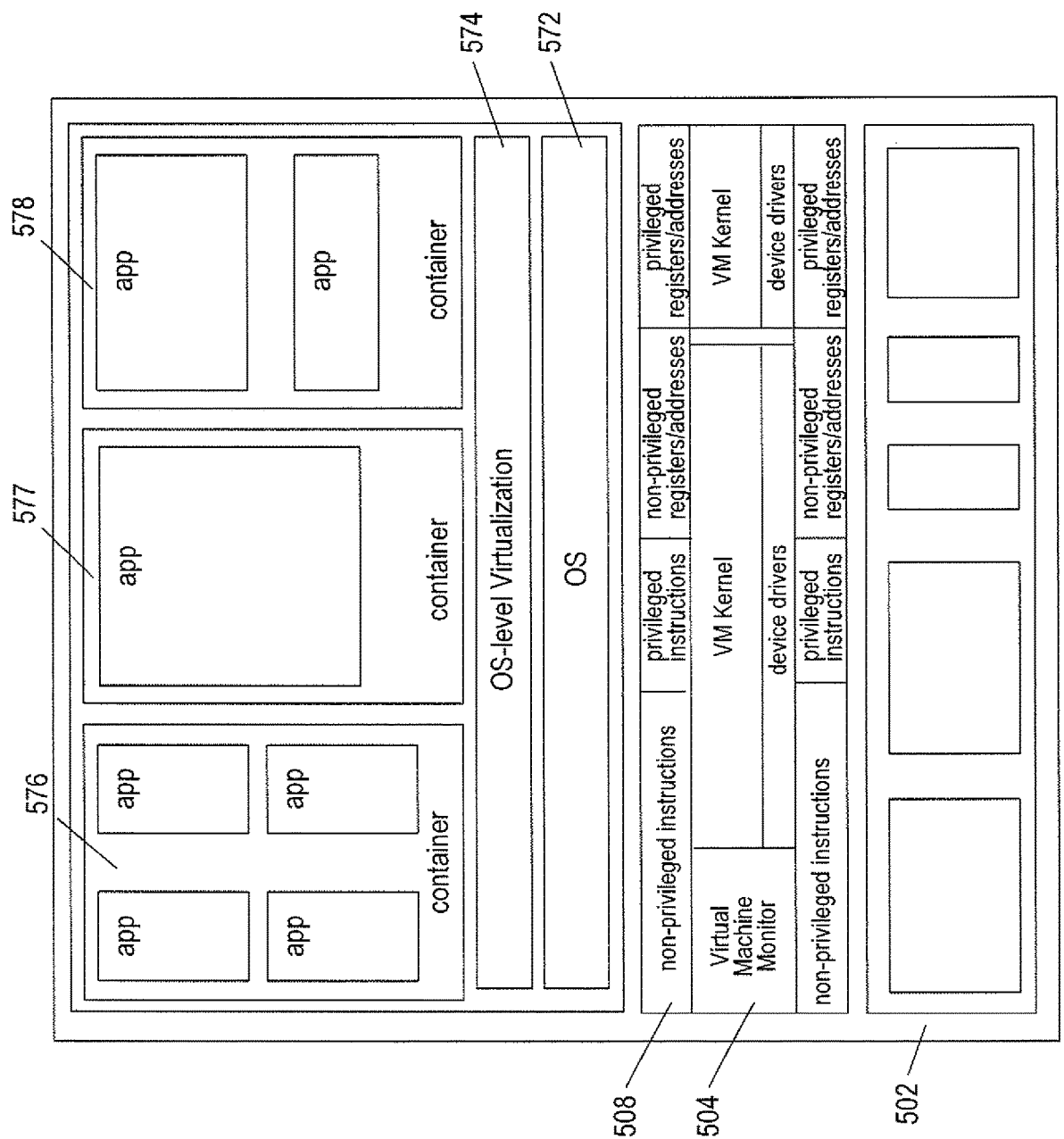

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
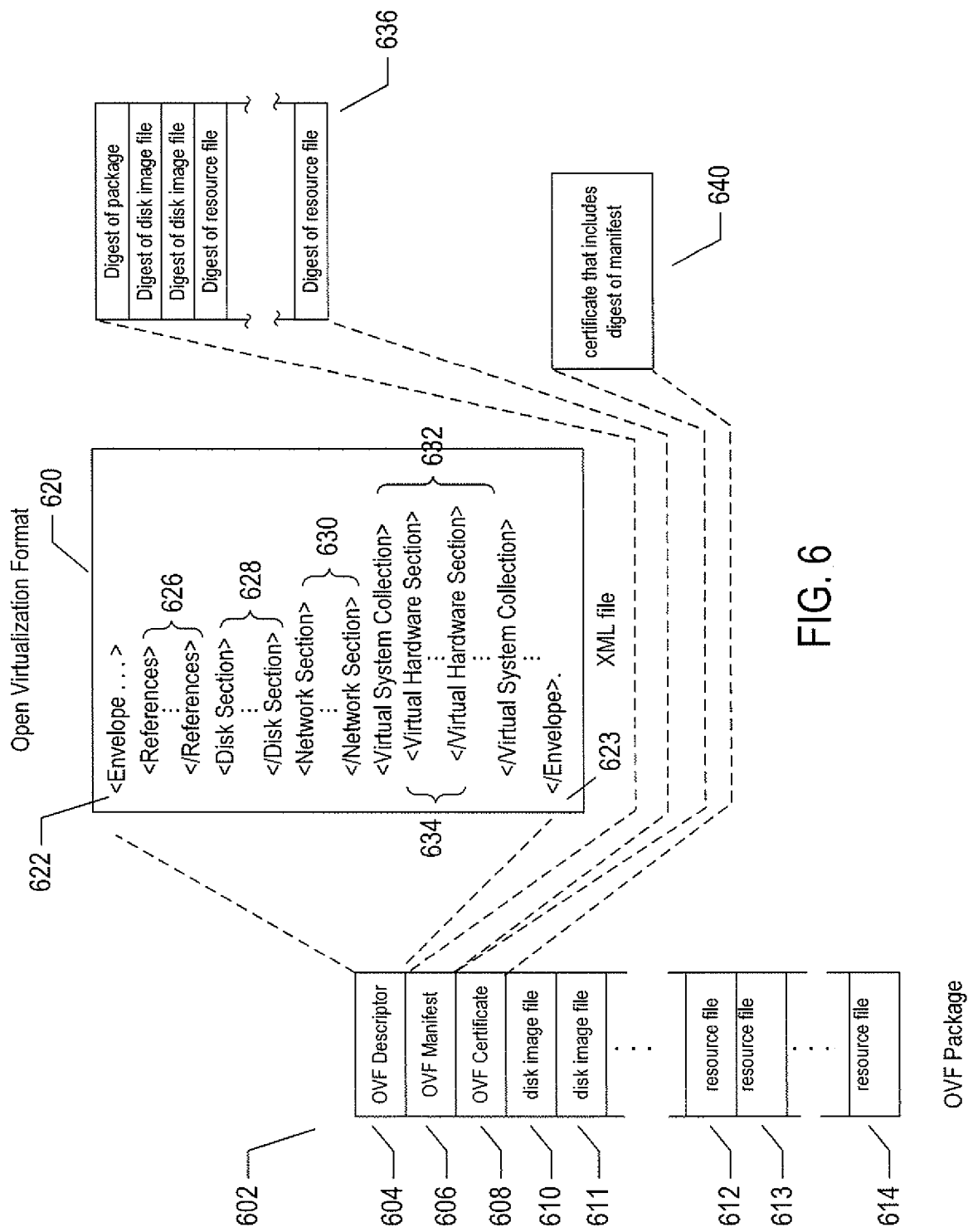
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
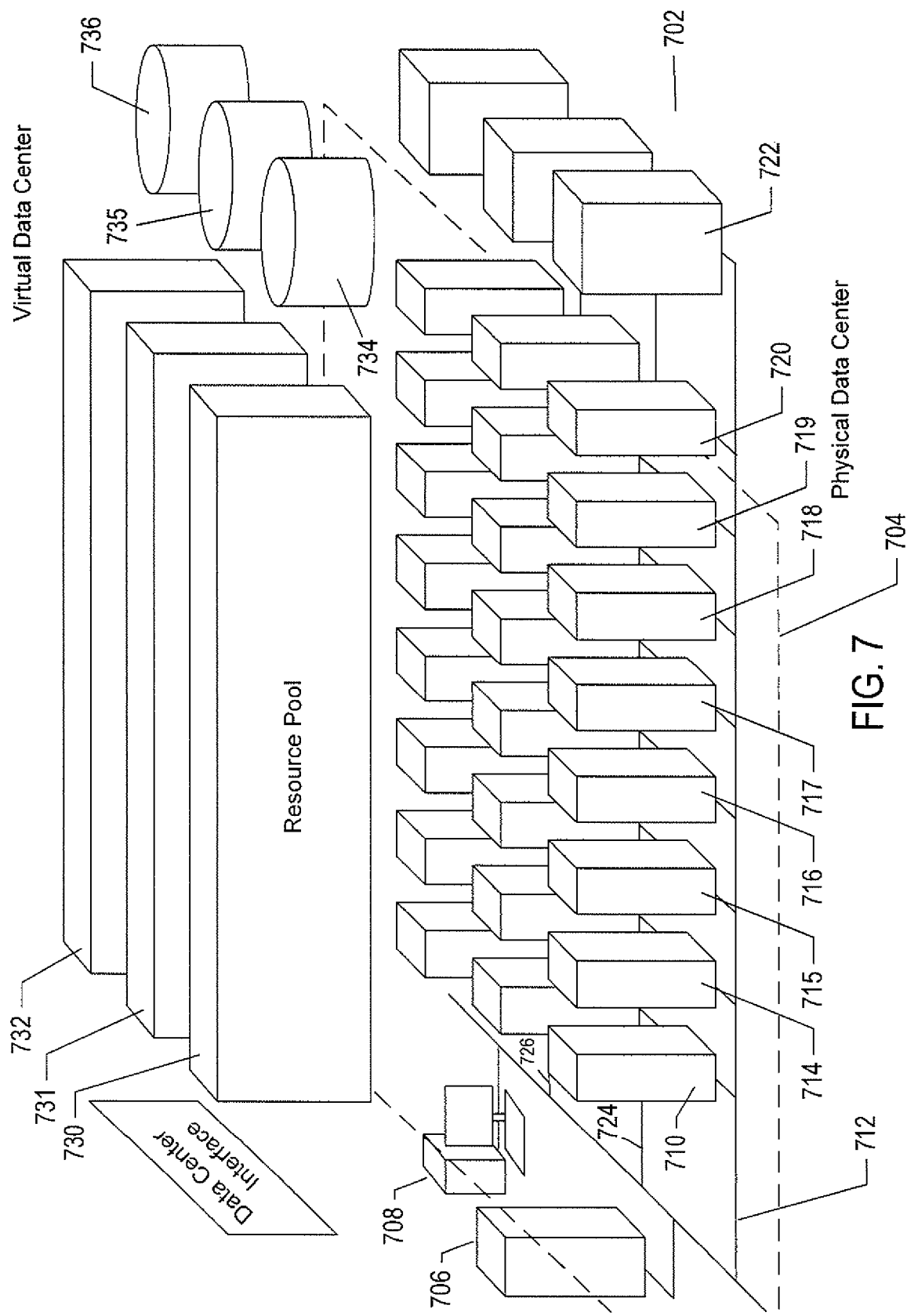
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
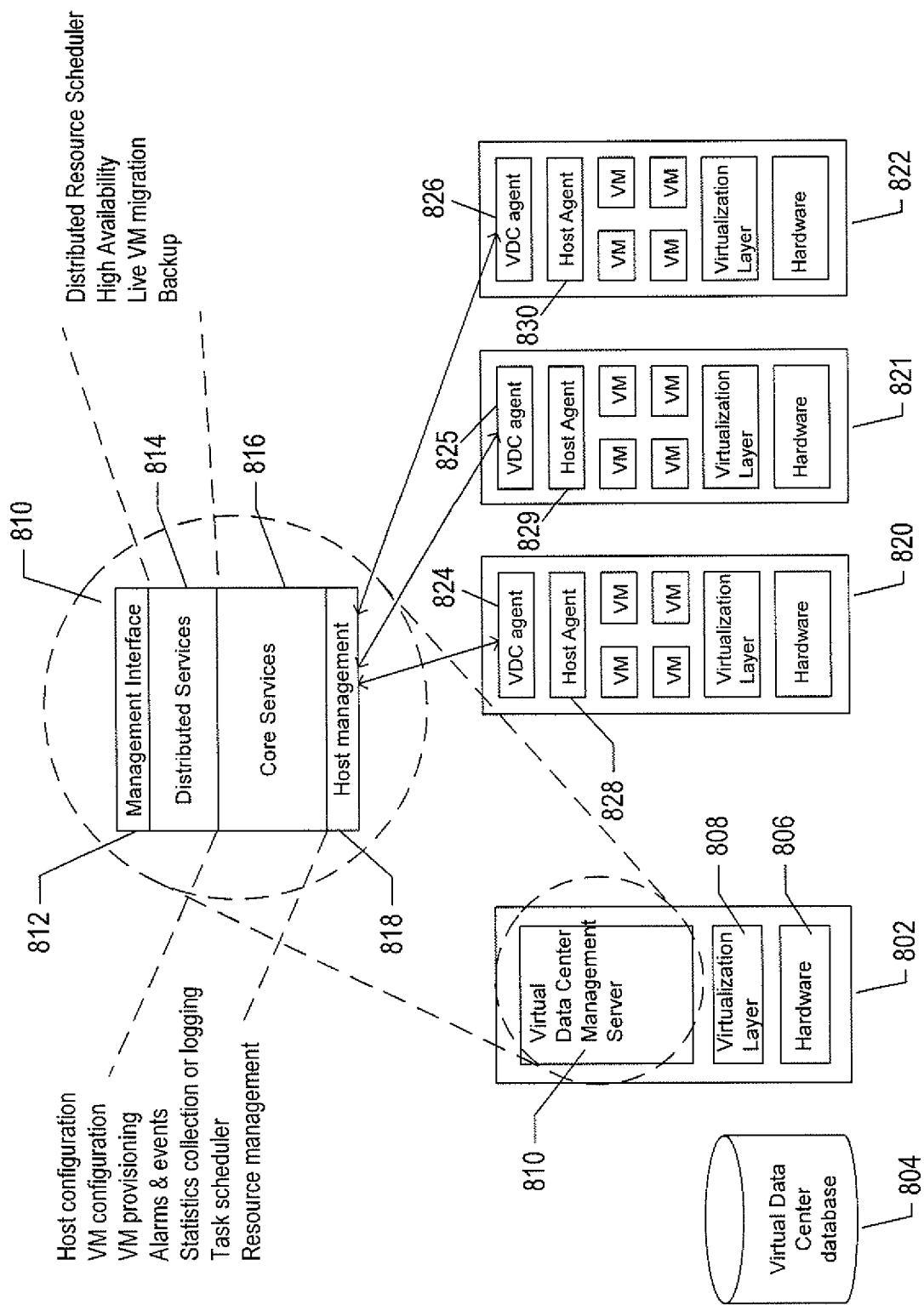
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
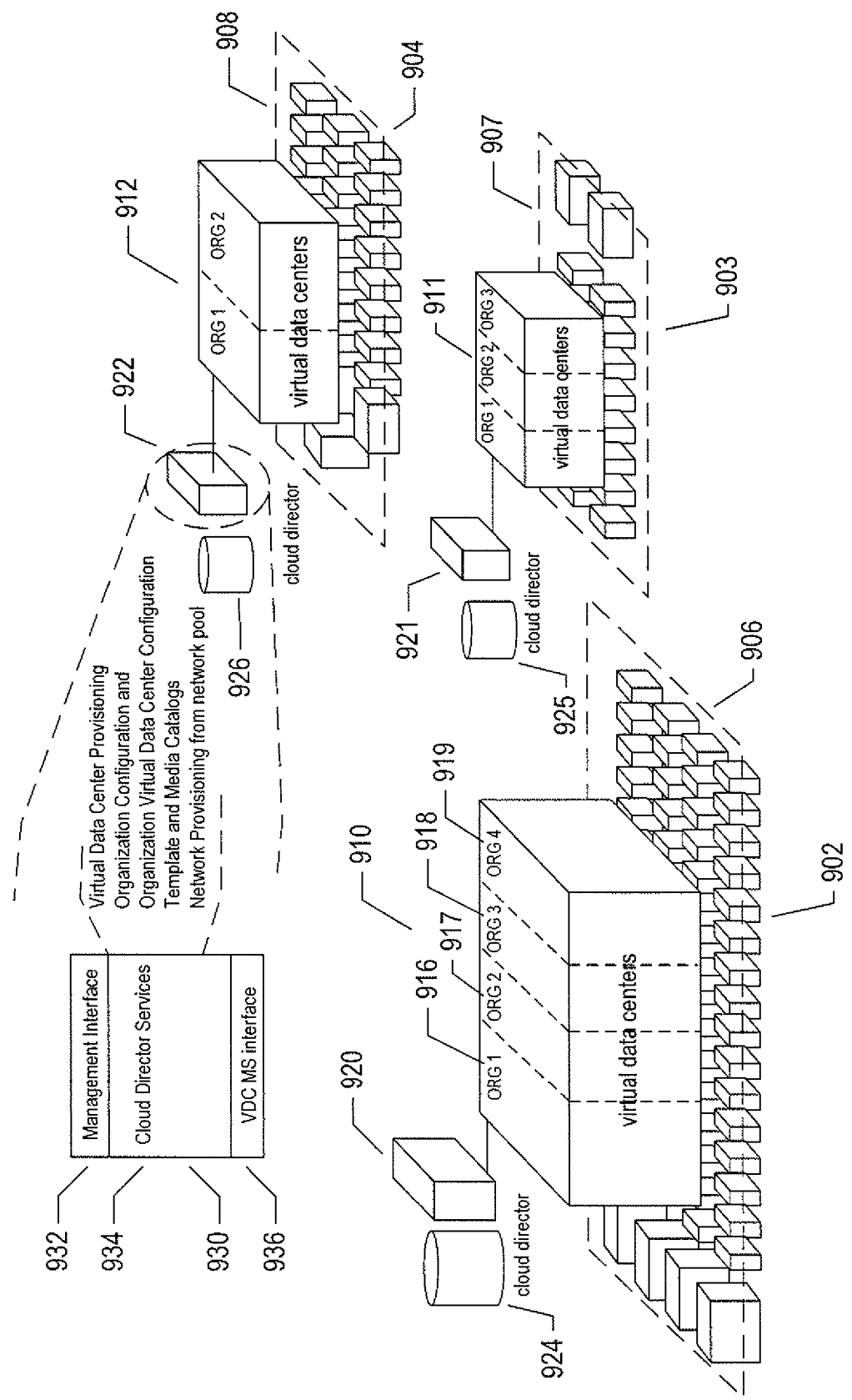
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
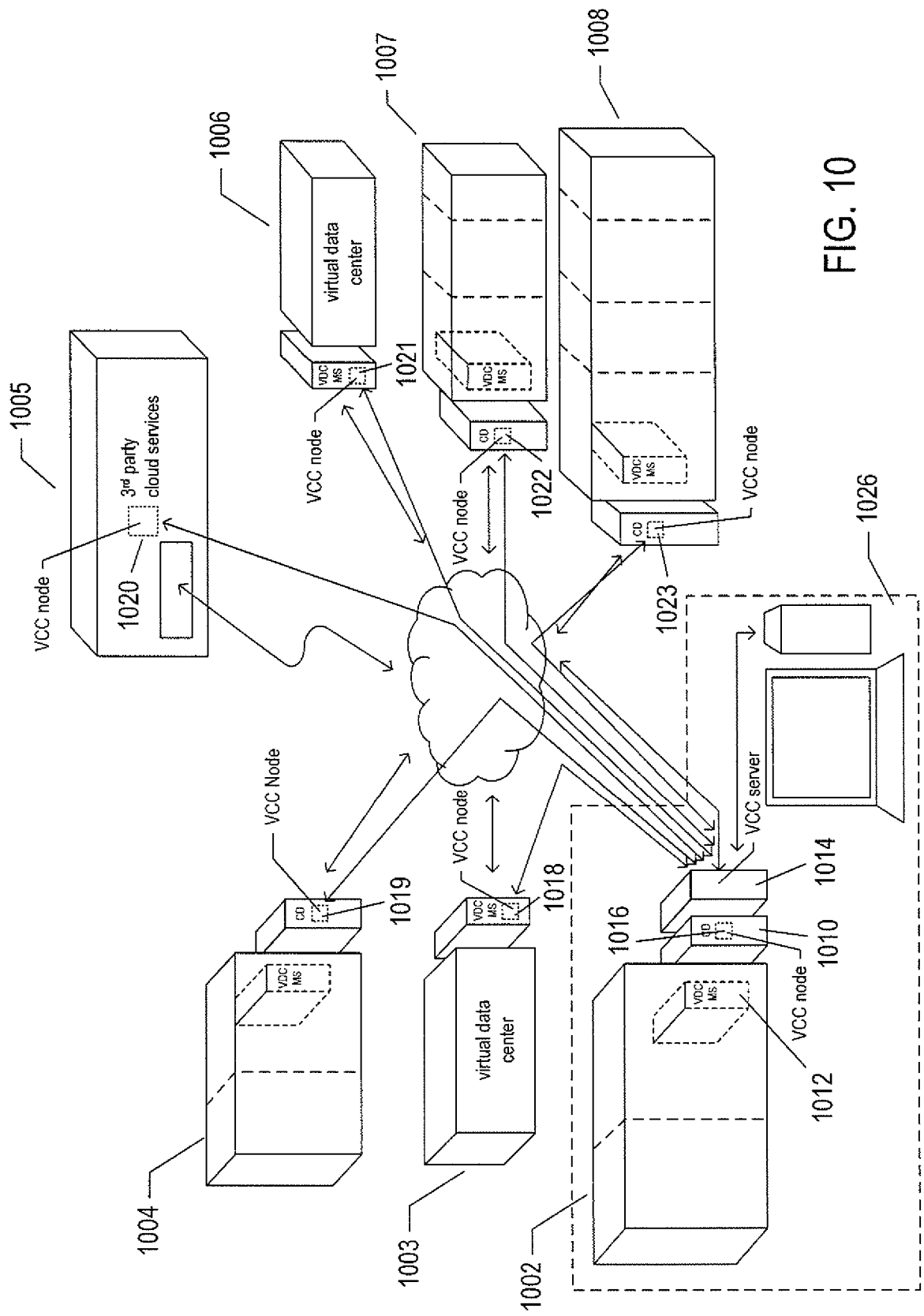
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Figure 11:
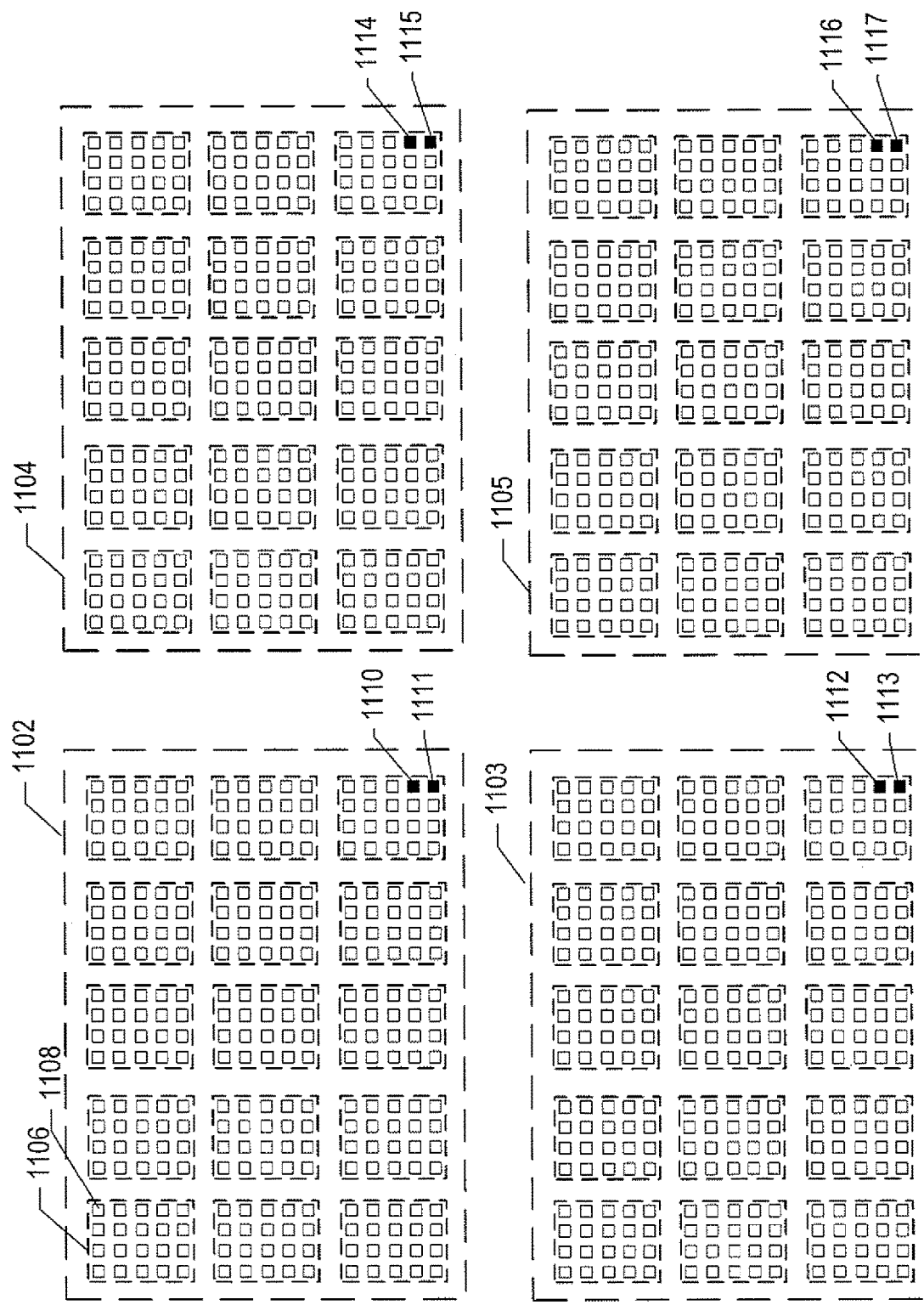
FIG. 11 illustrates a distributed data center or cloud-computing facility that includes a metric-data collection-and-storage subsystem.

FIG. 11 illustrates a distributed data center or cloud-computing facility that includes a metric-data collection-and-storage subsystem. The distributed data center includes four local data centers 1102-1105, each of which includes multiple computer systems, such as computer system 1106 in local data center 1102, with each computer system running multiple virtual machines, such as virtual machine 1108 within computer system 1106 of local data center 1102. Of course, in many cases, the computer systems and data centers are virtualized, as are networking facilities, data-storage facilities, and other physical components of the data center, as discussed above with reference to FIGS. 7-10. In general, local data centers may often contain hundreds or thousands of servers that each run multiple virtual machines. Several virtual machines, such as virtual machines 1110-1111 in a local data center 1102, may provide execution environments that support execution of applications dedicated to collecting and storing metric data regularly generated by other virtual machines and additional virtual and physical components of the data center. Metric-data collection may be, in certain cases, carried out by event-logging subsystems. In other cases, metric-data collection may be carried out by metric-data collection subsystems separate from event-logging subsystems. The other local data centers 1103-1105 may similarly include one or more virtual machines that run metric-data-collection and storage applications 1112-1117.

The metric-data-collection and storage applications may cooperate as a distributed metric-data-collection-and-storage facility within a distributed monitoring, management, and administration component of the distributed computing facility. These virtual machines, or additional virtual machines within the distributed computing facility, may provide execution environments for a variety of different data-analysis, management, and administration applications that use the collected metrics data to monitor, characterize, and diagnose problems within the distributed computing facility. While abstract and limited in scale, FIG. 11 provides an indication of the enormous amount metric data that may be generated and stored within a distributed computing facility, given that each virtual machine and other physical and virtual components of the distributed computing facility can generate hundreds or thousands of different metric data points at relatively short, regular intervals of time.

Figure 12:
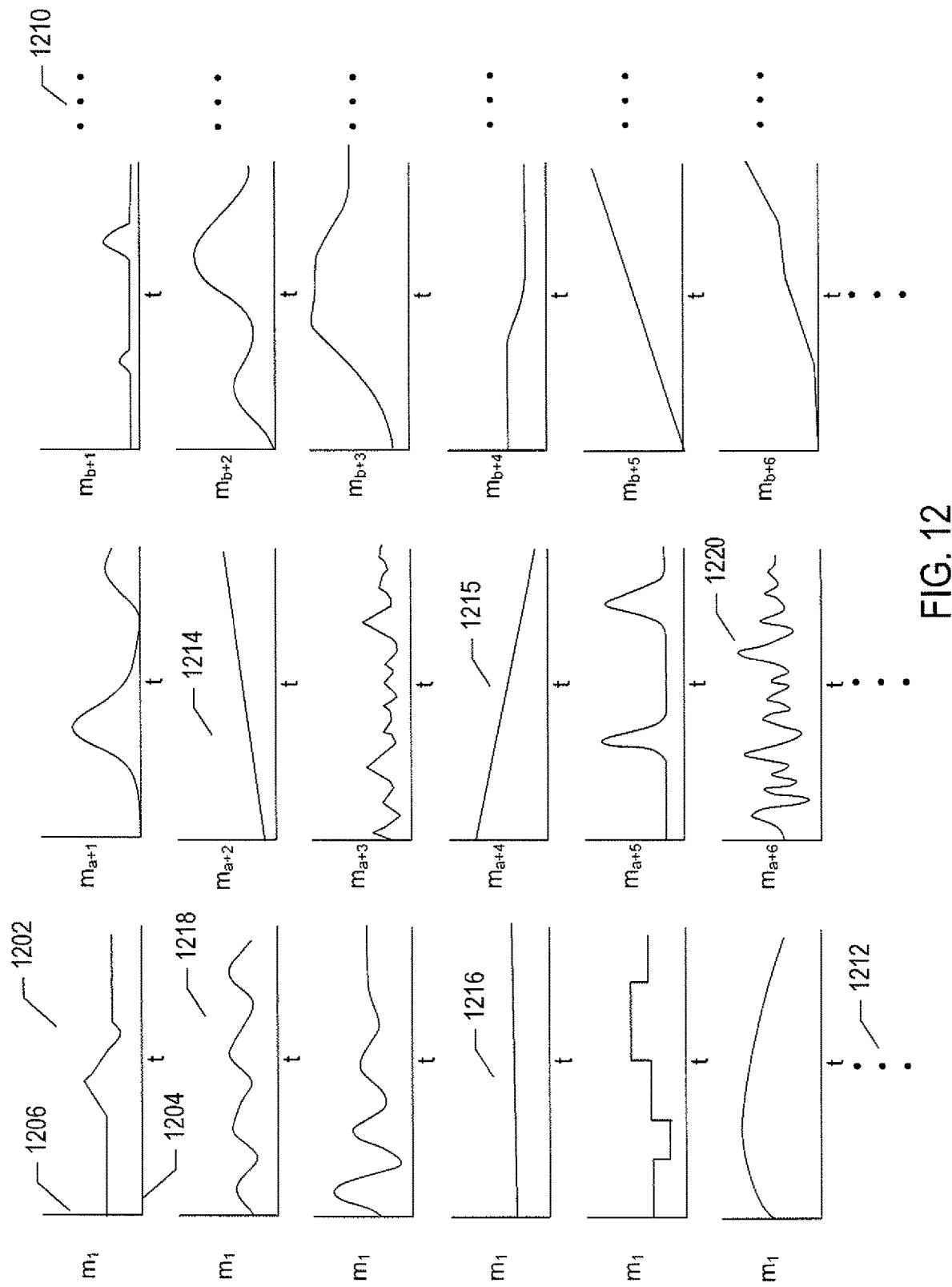
FIG. 12 illustrates the many different types of metric data that may be generated by virtual machines and other physical and virtual components of a data center, distributed computing facility, or cloud-computing facility.

FIG. 12 illustrates the many different types of metric data that may be generated by virtual machines and other physical and virtual components of a data center, distributed computing facility, or cloud-computing facility. In FIG. 12, each metric is represented as 2-dimensional plot, such as plot 1202, with a horizontal axis 1204 representing time, a vertical axis 1206 representing a range of metric values, and a continuous curve representing a sequence of metric-data points, each metric-data point representable as a timestamp/metric-data-value pair, collected at regular intervals. Although the plots show continuous curves, metric data is generally discrete, produced at regular intervals within a computing facility by a virtual or physical computing-facility component. A given type of component may produce different metric data than another type of component. For purposes of the present discussion, it is assumed that the metric data is a sequence of timestamp/floating-point-value pairs. Of course, data values for particular types of metrics may be represented as integers rather than floating-point values or may employ other types of representations. As indicated by the many ellipses in FIG. 12, such as ellipses 1210 and 1212, the set of metric-data types collected within a distributed computing facility may include a very large number of different metric types. The metric-data-type representations shown in FIG. 12 can be considered to be a small, upper, left-hand corner of a large matrix of metric types that may include many hundreds or thousands of different metric types. As shown in FIG. 12, certain metric types have linear or near-linear representations 1214-1216, other metric types may be represented by periodic or oscillating curves 1218, and others may have more complex forms 1220.

Figure 13:
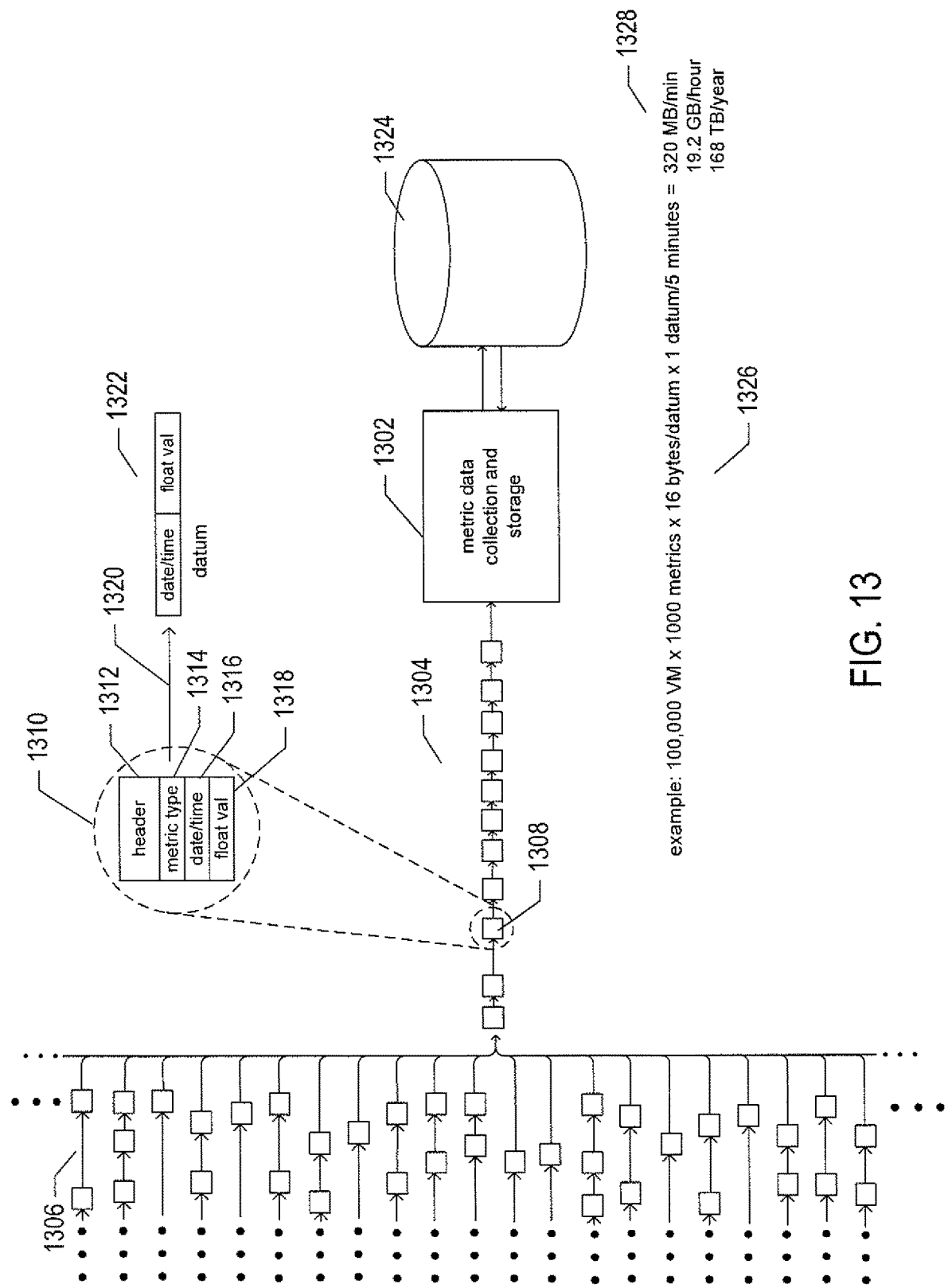
FIG. 13 illustrates metric-data collection within a distributed computing system.

FIG. 13 illustrates metric-data collection within a distributed computing system. As discussed above with reference to FIG. 11, a distributed computing system may include numerous virtual machines that provide execution environments for dedicated applications that collect and store metric data on behalf of various data-analysis, monitoring, management, and administration subsystems. In FIG. 13, rectangle 1302 represents a metric-data-collection application. The metric-data-collection application receives a continuous stream of messages 1304 from a very large number of metric-data sources, each represented by a separate message stream, such as message stream 1306, in the left-hand portion of FIG. 13. Each metric-data message, such as metric-data message 1308 shown in greater detail in inset 1310, generally includes a header 1312, an indication of the metric-data type 1314, a timestamp, or date/time indication 1316, and a floating-point value 1318 representing the value of the metric at the point in time represented by the timestamp 1316. In general, the metric-data collection-and-storage subsystem 1302 processes the received messages, as indicated by arrow 1320, to extract a timestamp/metric-data-value pair 1322 that is stored in a mass-storage device or data-storage appliance 1324 in a container associated with the metric-data type and metric-data source. Alternatively, the timestamp/metric-data-value pair may be stored along with additional information indicating the type of data and data source in a common metric-data container or may be stored more concisely in multiple containers, each associated with a particular data source or a particular type of metric data, such as, for example, storing timestamp/metric-data-value pairs associated with indications of a metric-datatype in a container associated with a particular metric-data source.

As indicated by expression 1326 in FIG. 13, assuming a distributed cloud-computing facility running 100,000 virtual machines, each generating 1000 different types of metric-data values every 5 minutes, and assuming that each timestamp/metric-data-value pair comprises two 64-bit values, or 16 bytes, the distributed cloud-computing facility may generate 320 MB of metric data per minute 1328, equivalent to 19.2 GB of metric data per hour or 168 TB of metric data per year. When additional metric-data-type identifiers and data-source identifiers are stored along with the timestamp/metric-data-value pair, the volume of stored metric data collected per period of time may increase by a factor of 2 or more. Thus, physical storage of metric data collected within a distributed computer system may represent an extremely burdensome data-storage overhead. Of course, that data-storage overhead also translates into a very high computational-bandwidth overhead, since the stored metric data is generally retrieved from the data-storage appliance or appliances and processed by data-analysis, monitoring, management, and administration subsystems. The volume of metric data generated and stored within a distributed computing facility thus represents a significant problem with respect to physical data-storage overheads and computational-bandwidth overheads for distributed computing systems, and this problem tends to increase over time as distributed computing facilities include ever greater numbers of physical and virtual components and as additional types of metric data are collected and processed by increasingly sophisticated monitoring, management, and administration subsystems.

Figure 14:
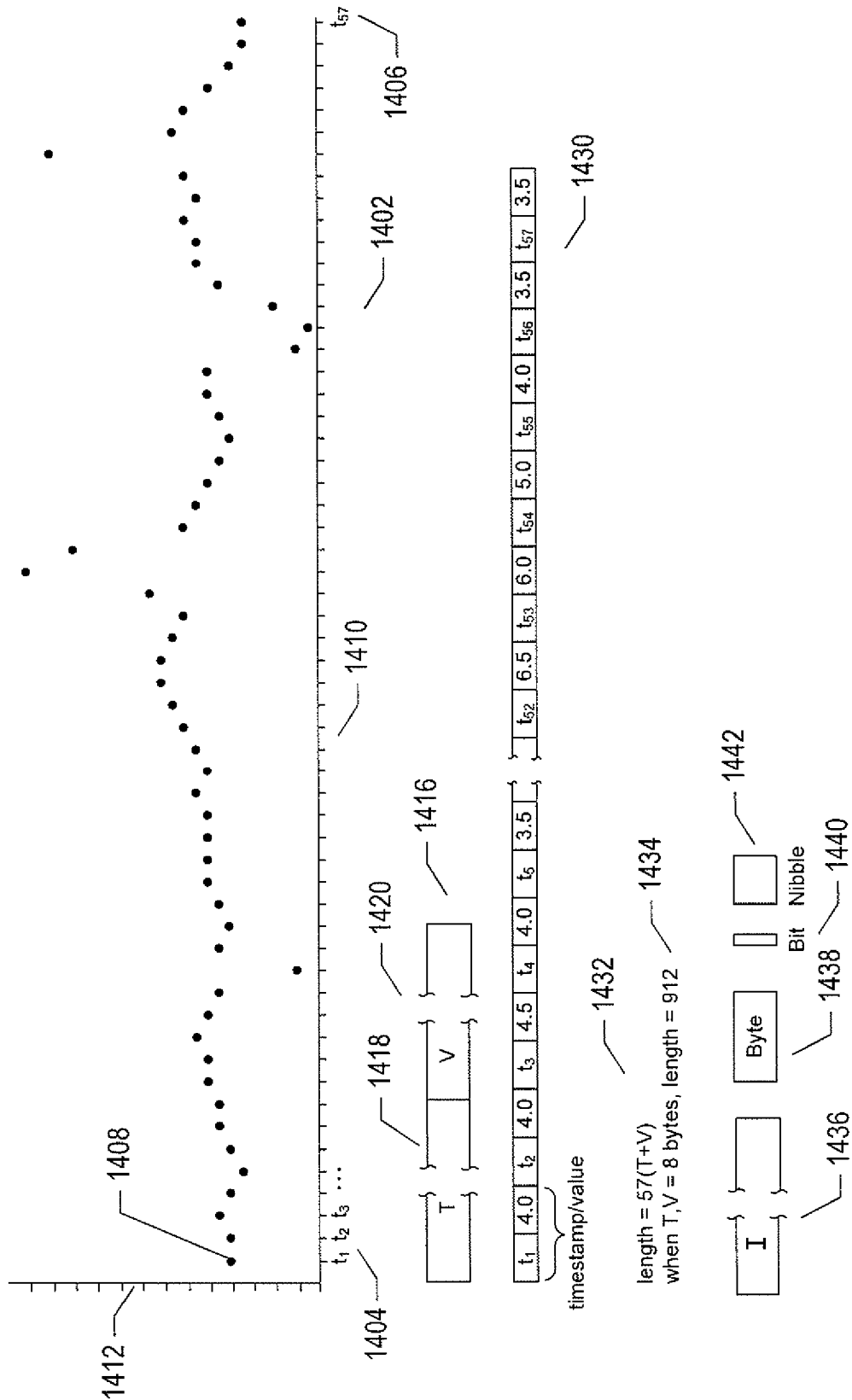
FIG. 14 illustrates a metric-data set and uncompressed storage of the metric-data set.

The currently disclosed methods and systems have been developed to address the problem discussed above, in the preceding paragraph, as well as additional problems associated with the collection, storage, and analysis of metric data within distributed computing systems. FIG. 14 illustrates a metric-data set and uncompressed storage of the metric-data set. At the top of FIG. 14, the plot 1402 shows a portion of a metric-data set collected from time $t_1$ 1404 to time $t_{57}$ 1406. The metric-data set comprises a sequence of timestamp/metric-data-value pairs, also referred to as "data points." In FIG. 14, each data point is represented, in plot 1402, as a shaded disk, such as the shaded disk 1408 corresponding to a data point representing the timestamp/metric-data-value pair $t_1/4.0$. As discussed above, in this example, the data points are regularly spaced, in time, forming a temporal sequence of metric-data values. The horizontal axis 1412 of plot 1402 represents time and the vertical axis 1410 plot 1402 represents metric-data values. For the purposes of the current discussion, metric-data values are considered to be floating-point representations of scaler values. However, in general, any of many different types of metric-data-value representations may be used for metric-data sets. Timestamps are commonly represented by a large integer that indicates the number of time units that have transpired since an arbitrary point in time. Again, however, the timestamps associated with the metric-data values may be expressed in any of many different ways. Although, in the current example, the data points are regularly spaced in time, the currently disclosed methods can be applied to metric-data sets in which the data points are not regularly spaced in time.

As shown by the data-point representation 1416 below plot 1402 in FIG. 14, each data point is represented as a timestamp 1418 followed by a metric-data value 1420 stored in consecutive bytes in a computer memory and/or in consecutive bytes in a mass-storage device. The number of bytes used to encode the timestamp 1418 and the metric-data value 1420 may vary with different implementations and different computer-hardware platforms. Commonly, the timestamp and the metric-data value may each be encoded in 32 bits, or 4 bytes, or may be encoded in 64 bits, or 8 bytes, depending on the hardware platforms and various design choices. As indicated by representation 1430 below diagram 1420 in FIG. 14, the metric-data set illustrated in plot 1402 can be stored as a sequence of timestamp/metric-data-value pairs in memory and/or in a mass-storage device. The length of the stored metric-data set is, as shown in expression 1432, the product of the number of data points, 57, and the sum of the sizes of the representations of the timestamp and metric-data value. Assuming 8-byte representations for each timestamp and metric-data value, the length of the memory-resident or mass-storage-device-resident metric-data set is 912 bytes 1434.

FIG. 14 additionally shows a number of other units commonly used for data representation, including an integer 1436, generally 2, 4, 8, or 16 bytes 1438, a byte 1438 comprising 8 bits, a bit 1440, and a nibble 1442, comprising 2 or 4 bits, in the following discussion. A bit 1440 is the smallest unit of data storage and data representation in a digital computer, and represents one of two values {0,1}. These additional units of data representation are used in various compressed representations of the metric-data set, discussed below.

Figure 15:
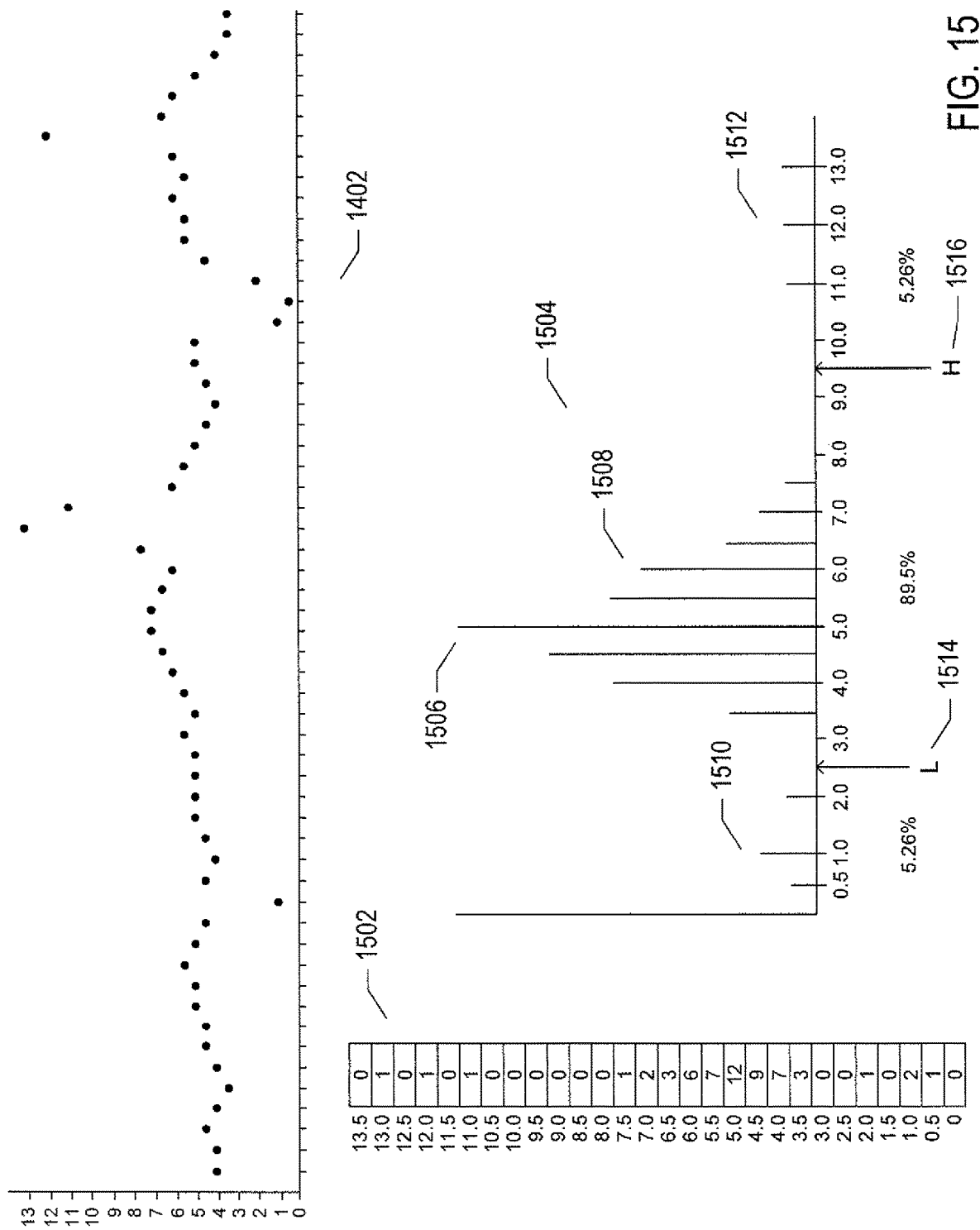
FIG. 15 illustrates the distribution of metric-data values in the metric-data set discussed above with reference to FIG. 14.

FIG. 15 illustrates the distribution of metric-data values in the metric-data set discussed above with reference to FIG. 14. Plot 1402 from FIG. 14 is again shown at the top of FIG. 15. In table 1502, the numbers of data points for each of the metric-data values that occur in the metric-data set are tabulated. In plot 1504, the tabulated numbers of data points for each of the metric-data values are represented as a histogram. The histogram can be thought of as a rotation of table 1502 by $\pi/2$ radians and replacing the numbers of data points with vertical line segments with lengths proportional to the numbers of data points. The tallest column 1506 in the histogram represents 12 occurrences of the metric-data value 5.0. As clearly shown by the histogram, there is a central range of metric-data values corresponding to a large central peak 1508 in the histogram to which the majority of data points belongs. In addition, there is a relatively small range of metric-data values 1510 to the left of the central peak and a relatively small range of metric-data values 1512 to the right of the central peak. For the illustrated metric-data set, it is natural to define a lower metric-data-value threshold L 1514 and a higher metric-data-value threshold H 1516 that together define the extent of the main central peak of data points and that together partition the full range of metric-data values into a lower outlying range 1510, a central inlier range 1508, and a higher outlying range 1512. The data points with metric-data values in the central inlying range are considered to be inlier data points and data points with metric-data values in either of the two outlying ranges are considered to be outlier data points. Of course, the data points of a metric-data set may not be trimodally distributed, as in the current example. Nonetheless, in general, a metric-data set can generally be considered to comprise lower outlier data points, higher outlier data points, and inlier data points defined by a lower metric-data-value threshold L and a higher metric-data-value threshold H.

Figure 16:
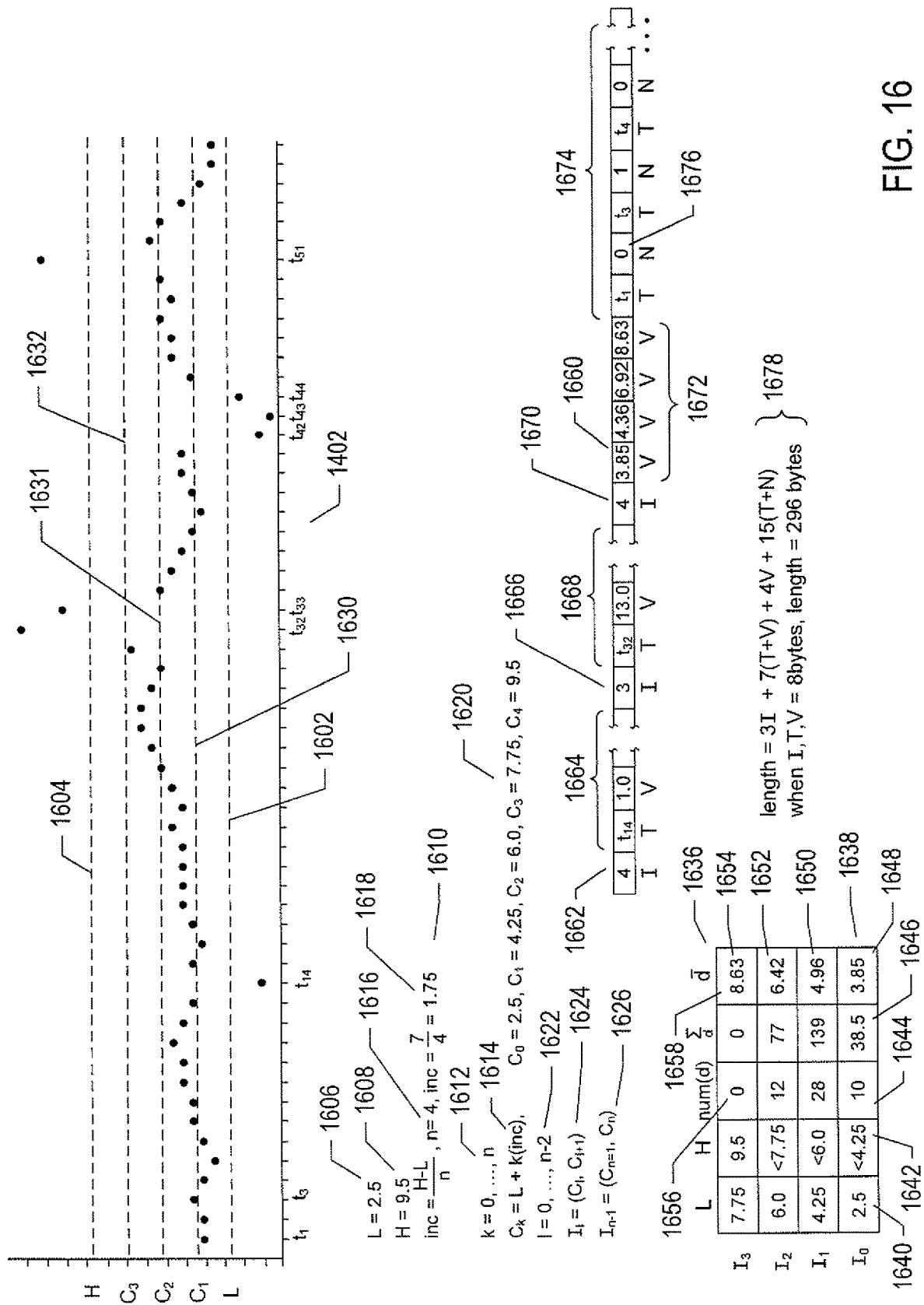
FIG. 16 illustrates one implementation of the currently disclosed metric-data-start compression method.

FIG. 16 illustrates one implementation of the currently disclosed metric-data-start compression method. Plot 1402 of the metric-data set is again shown at the top of FIG. 16. Horizontal dashed line 1602 represents the lower threshold (1514 in FIG. 15) and horizontal dashed line 1604 represents the higher threshold (1516 in FIG. 15). Numerical values for the lower threshold 1606 and the higher threshold 1608 are provided below the plot in FIG. 16 for the current example. Expression 1610 in FIG. 16 is used to compute a quantization-interval width, which is the difference between the numerical values of the higher and lower thresholds divided by a number and of desired quantization intervals. An index k 1612 ranges from 0 to n. A set of thresholds $c_k$ for the quantization intervals is computed using expression 1614. In the current example, the value of n is 4 (1616 in FIG. 16), the quantization-interval width is 1.75 (1618 in FIG. 16), and the n+1=5 quantization thresholds 1620 are: $c_0$=2.5, $c_1$=4.25, $c_2$=6.0, $c_3$=7.75, and $c_4$=9.5. The lower quantization intervals are numbered by an index l that ranges from 0 to n−2 1622. All but the highest quantization interval are defined by the ranges 1624, while the highest quantization interval is defined by the range 1626. The quantization threshold $c_0$ corresponds to the lowest threshold L represented by the dashed line 1602 in plot 1402. The quantization threshold $c_4$ corresponds to the highest threshold represented by the dashed line 1604 in plot 1402. The remaining quantization thresholds $c_1$, $c_2$, and $c_3$ correspond to horizontal dashed lines 1630, 1631, and 1632, respectively.

Table 1636 illustrates determination of a representative metric-data value for each quantization interval. Each row in table 1636 represents one of the four quantization intervals in the current example. For example, row 1638 represents the first quantization interval $I_0$ defined by the metric-data-value range [2.5, 4.25] (1640 and 1642 in FIG. 16). This range corresponds to the horizontal strip in plot 1402 that includes horizontal dashed line 1602 and that is bounded, from above, by horizontal dashed line 1630. There are 10 data points 1644 in this quantization interval. The sum of the metric-data values for those 10 data points is 38.5 (1646 in FIG. 16). In one implementation, a representative metric-data value for this quantization interval is computed as the average metric-data value for the data points in the quantization interval, 3.85 (1648 in FIG. 16) in the current example. A similar determination is made for the representative metric-data values for the second 1650 and third 1652 quantization intervals. The fourth quantization interval 1654 contains no data points 1656 in the current example. The representative metric-data value for the fourth quantization interval 1658, 8.63, is computed as the average value of the metric-data values corresponding to the quantization thresholds that define the fourth quantization interval.

The information contained in table 1638 is used to compress the metric-data set according to one implementation of the currently disclosed metric-data compression method. The compressed metric-data set is illustrated by representation 1660 in FIG. 16. A first integer 1662 stores the number of outlier data points below the lower threshold L. The first integer is followed by uncompressed timestamps/metric-data-value pairs representing the outlier data points below the threshold level L 1664. A second integer 1666 stores a number of outlier data points above the higher threshold H. The second integer is followed by uncompressed timestamps/metric-data-value pairs representing the outlier data points above the higher threshold age 1668. A third integer 1670 stores the number n and is followed by the metric-data values representative of the n quantization intervals 1672. Finally, the compressed inlier data-point representations 1674 complete the compressed metric-data set. The representations of the inlier data points, in the final portion 1674 of the compressed metric-data set, each includes a timestamp and a short integer that represents the quantization interval in which the data point lies. In the current example, the quantization interval is encoded in a 2-bit short integer, such as nibble 1676. As mentioned above, 2 or more adjacent data points in a temporal sequence having the same quantization interval are compressed to a single data-point representation. As indicated by expression 1678 in FIG. 16, the length, in bytes, of the compressed metric-data set is 292. Of course, with larger metric-data sets, larger compression ratios are normally achieved, since the overhead for storing the 3 integers and the representative metric-data values for the quantization intervals becomes insignificant. For many types of metric-data sets, elimination of redundant inlier data points in the compressed metric-data set can lead to very high compression ratios.

Figure 17:
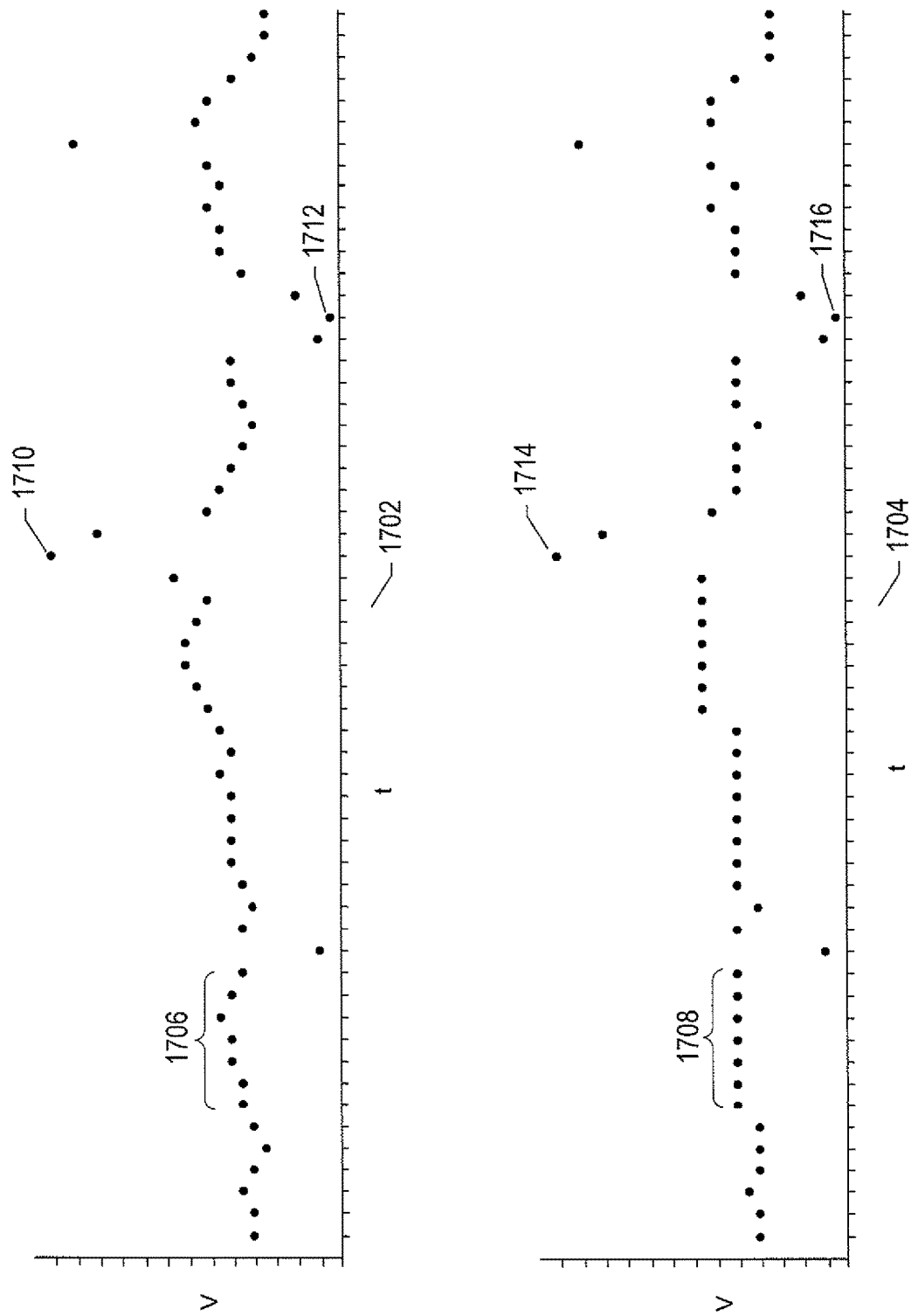
FIG. 17 illustrates a comparison between the original metric-data set, used in the example of FIGS. 14-16, and a decompressed metric-data set obtained by decompressing the compressed metric-data set illustrated in FIG. 16.

FIG. 17 illustrates a comparison between the original metric-data set, used in the example of FIGS. 14-16, and a decompressed metric-data set obtained by decompressing the compressed metric-data set illustrated in FIG. 16. A plot of the original metric-data set 1702 is shown at the top of FIG. 17, and a similar plot of the decompressed metric-data set 1704 is shown below plot 1702. Because each inlier data point is represented by the representative metric-data value for its quantization interval, the detailed variations in subsequences of data points with slightly varying metric-data values, such as subsequence 1706 in the original metric-data set, are lost or flattened in the corresponding decompressed metric-data set 1708. However, outlier data points, such as outlier data points 1710 and 1712 in the original metric-data set, are unaltered 1714 and 1716 in the decompressed data set.

Figure 18:
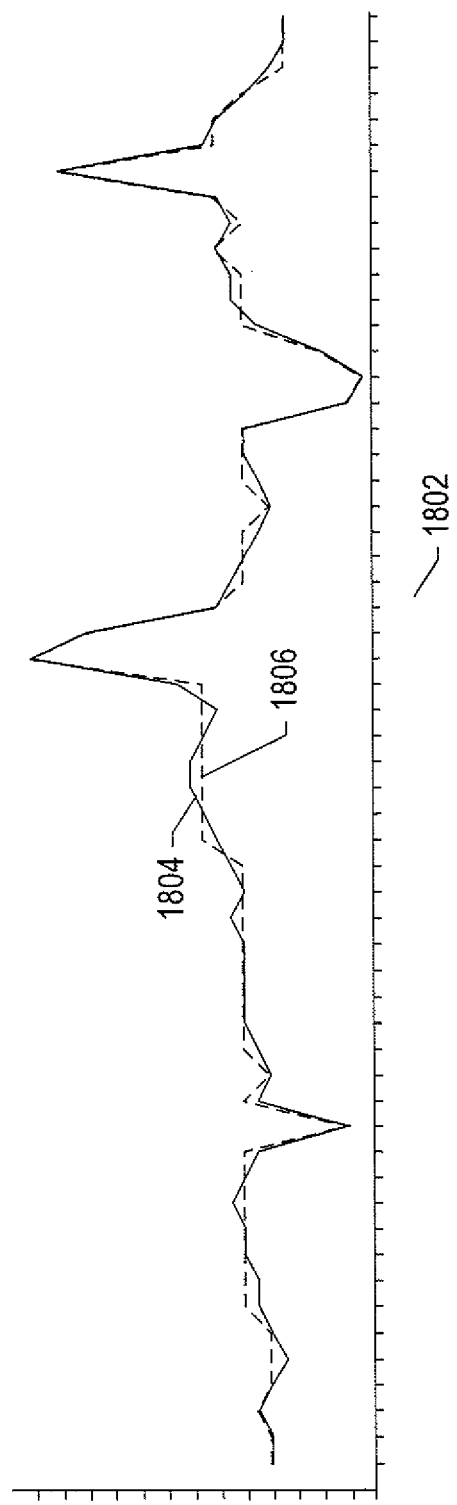
FIG. 18 superimposes a connected-line-segment representation of the original metric-data set and the corresponding decompressed metric-data set.

FIG. 18 superimposes a connected-line-segment representation of the original metric-data set and the corresponding decompressed metric-data set. In the plot 1802 shown in FIG. 18, the original metric-data set is represented by a segmented, solid-line curve 1804 and the corresponding decompressed metric-data set is represented by a segmented, dashed-line curve 1806. Both curves are generated by connecting data points with straight-line segments. As can be readily observed from plot 1802, the overall shape and form of the original metric-data set and the corresponding decompressed metric-data set are quite similar. An error value or metric can be computed for the compression/decompression of the metric-data set according to expression 1810 in FIG. 18. The error value is the average difference in the metric-data values for an original data point and the corresponding compressed/decompressed data point.

Figure 19:
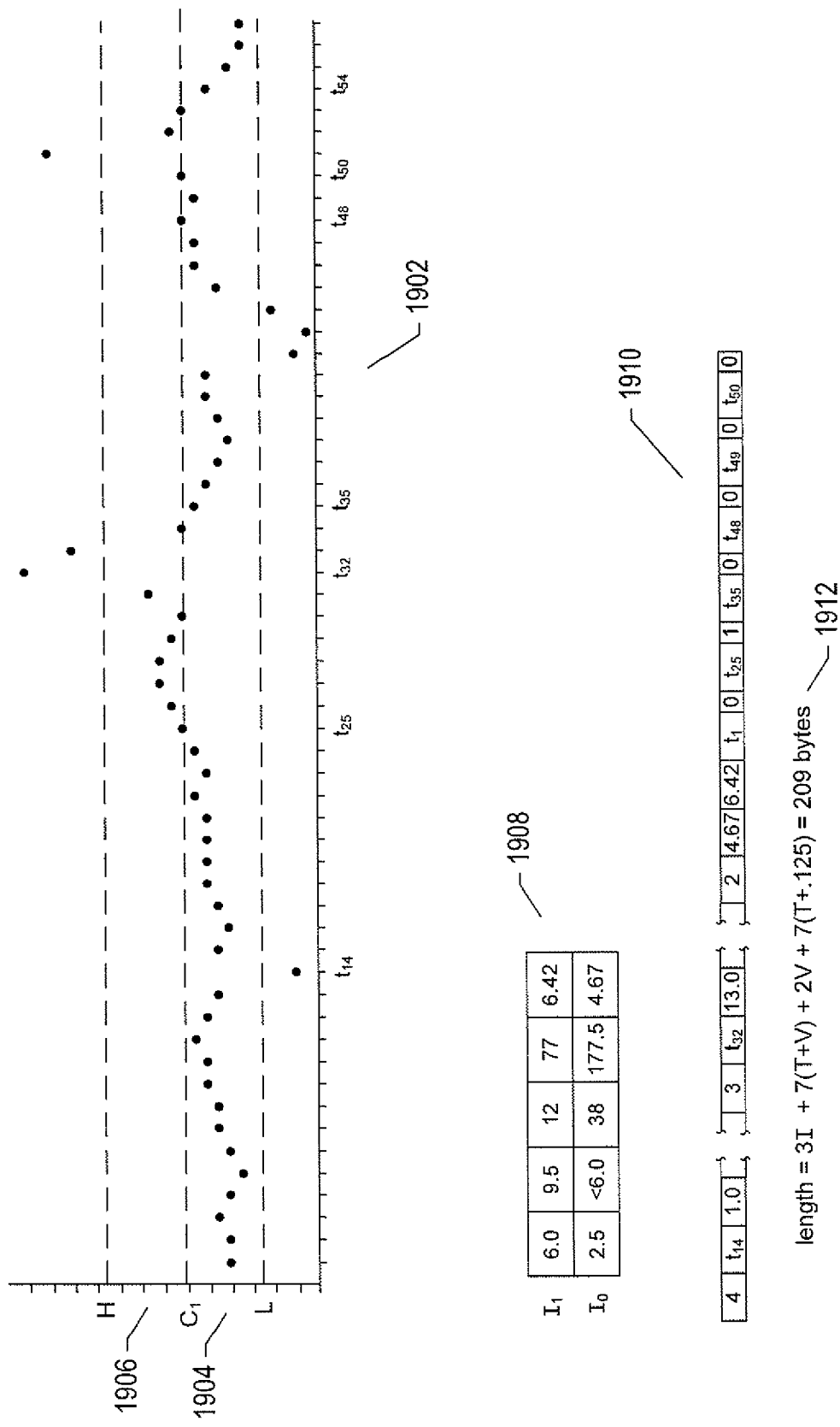
FIGS. 19-21 illustrate compression of the metric-data set shown in FIG. 14 using different decompression parameter values than used in the decompression illustrated in FIGS. 16-18.
Figure 20:
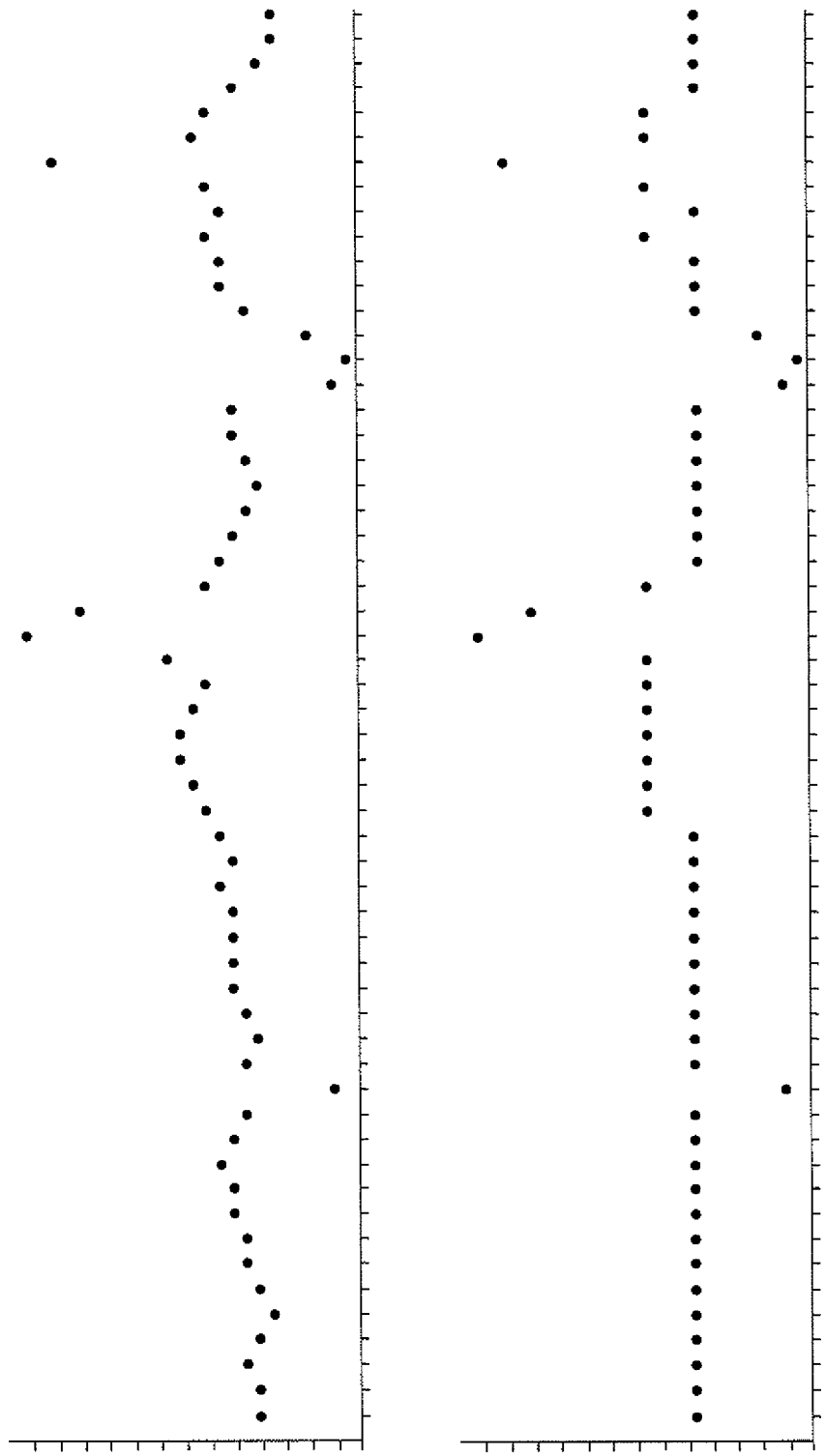
Figure 21:
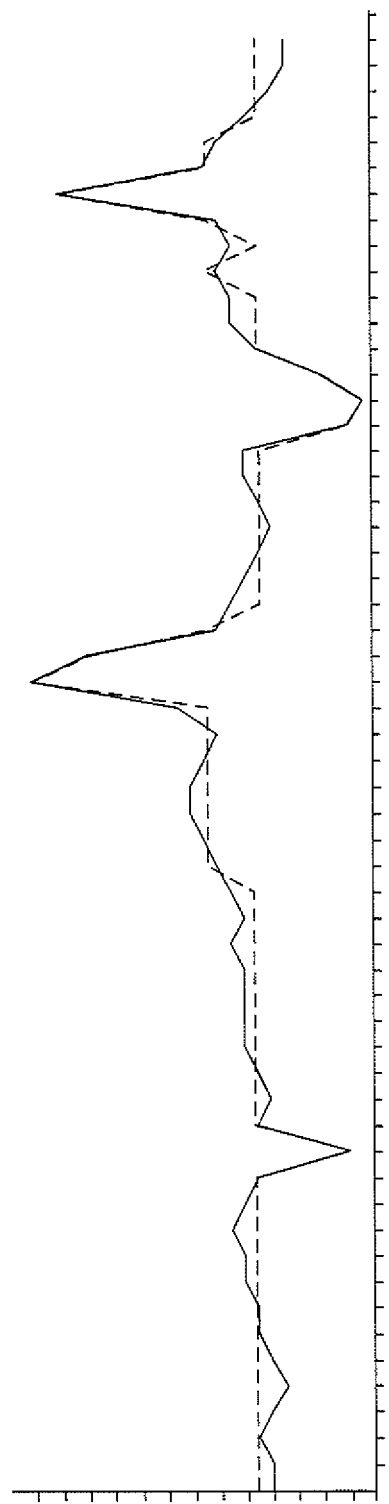

FIGS. 19-21 illustrate compression of the metric-data set shown in FIG. 14 using different decompression parameter values than used in the decompression illustrated in FIGS. 16-18. FIGS. 19-21 use the same illustration conventions used in FIGS. 16-18. At the top of FIG. 19, a plot 1902 of the metric-data set is provided in similar fashion to plot 1402 in FIG. 14. However, in this second example, n=2 and there are therefore only 2 quantization intervals 1904 and 1906 for the inlier data points and thus only two rows in the table 1908. Diagram 1910 illustrates the compressed metric-data set in similar fashion to illustration of the compressed data set by representation 1660 in FIG. 16. When only two quantization intervals are used, the compressed metric-data set comprises only 209 bytes (1912 in FIG. 19). FIG. 20 illustrates a comparison between the original metric-data set and the compressed/decompressed metric-data set, in the same fashion as in FIG. 17, and FIG. 21 shows the original metric-data set superimposed together with the compressed/decompressed metric-data set, as in FIG. 18. A comparison of FIG. 20 with FIG. 17 and a comparison of FIG. 21 with FIG. 18 reveals that a decrease in the number of quantization intervals has resulted in a greater error or disparity between the original metric-data set and the corresponding compressed/decompressed metric-data set. Thus, the number of quantization intervals is one significant parameter controlling the characteristics of the currently disclosed compression method. In general, decreasing the number of quantization intervals increases the error but also increases the degree of compression. However, the quantitative effects of varying this parameter differs for different types of metric-data sets. For metric-data sets with high variability, the degree of compression and the error increase non-linearly, but relatively gradually with a decrease in the number of quantization intervals. For low-variability metric-data sets, the error remains low as number of quantization intervals is decreased until the number of quantization intervals reaches a small integer value, such as 2 or 3, and then rapidly increases when the quantization interval is further decreased. By contrast, the degree of compression increases gradually as the number of quantization intervals decreases over a much broader range of numbers of quantization intervals. The error rate, degree of compression, and usefulness of decompressed metric data may also vary significantly depending on the choice of lower and higher thresholds L and H.

Figure 22A:
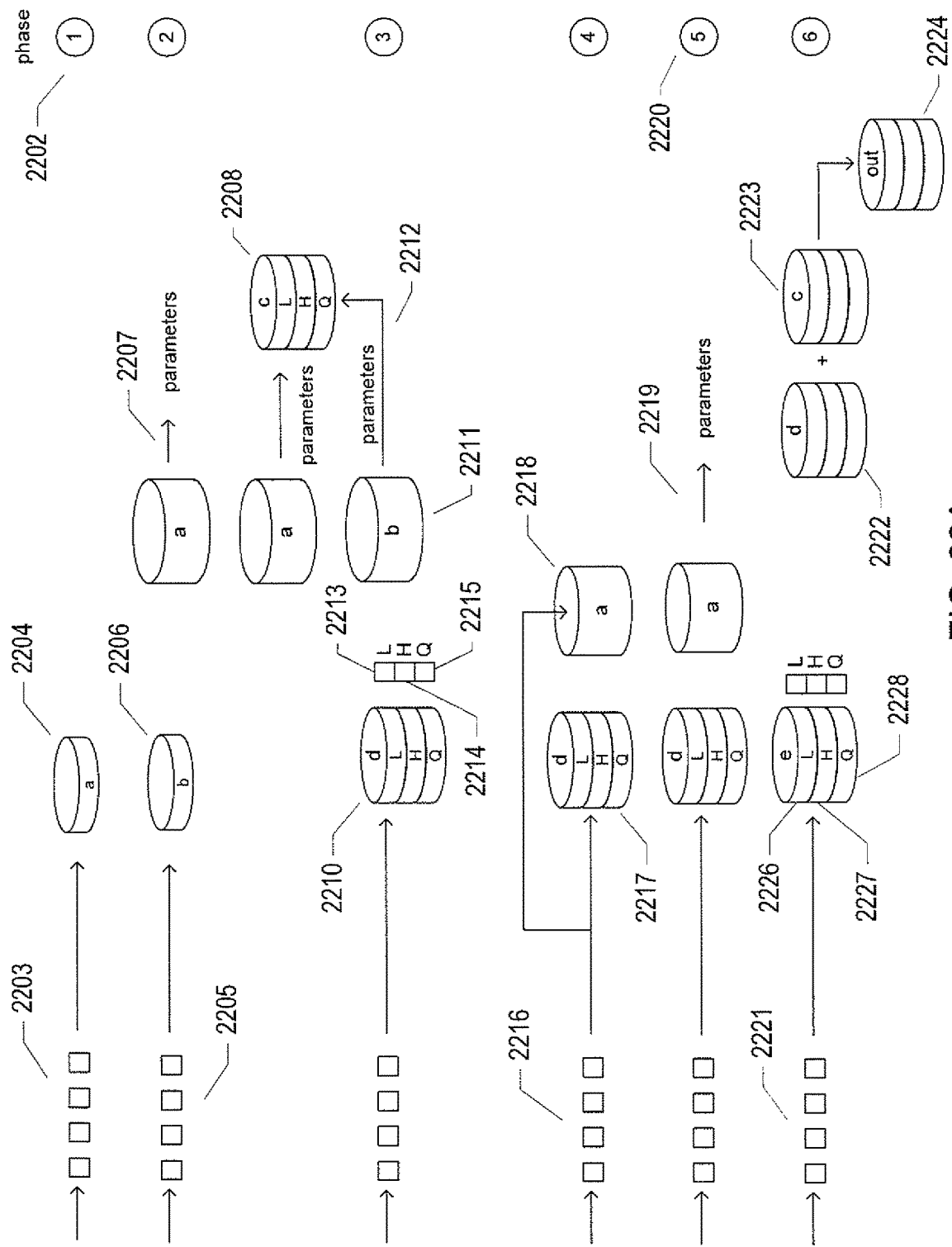
FIGS. 22A-E illustrates one implementation of a metric-data collection-and-storage subsystem within a distributed computing system that collects, compresses, and stores a multidimensional metric-data set for subsequent analysis and use in monitoring, managing, and administrating the distributed computing system.

FIGS. 22A-E illustrates one implementation of a metric-data collection-and-storage subsystem within a distributed computing system that collects, compresses, and stores a multidimensional metric-data set for subsequent analysis and use in monitoring, managing, and administrating the distributed computing system. FIG. 22A illustrates, at a high-level, various phases of data collection, compression, and storage for a metric-data set. In FIG. 22A, phases are indicated by circled integers at the right-hand edge of the figure, such as the circled integer "1" 2202 indicating the first phase of metric-data-set collection, compression, and storage. During the first phase, data points 2203 are received and stored 2204 without compression. In a second phase, when a sufficient number of data points have been collected to undertake parameter-value determination, received data points 2205 are stored in a second container 2206 while parameter-value determination is carried out on the initially stored data points 2207. Once parameter values have been determined, the initially stored data points are compressed to generate an initial set of compressed data points 2208. In a third phase, once continuous compression is possible, subsequently received data points 2209 are continuously compressed for storage 2210 while, concurrently, the remaining uncompressed data points 2211 are compressed 2212. During continuous compression, the subsystem keeps track of the number of outlier data points below the lower threshold 2213, the number of outlier data points above the higher threshold 2214, and the number of inlier data points 2215. When the ratio of outlier data points to inlier data points increases above a threshold value, or when the ratio of the number of outlier data points below the lower threshold to the number of outlier data points above the higher threshold falls over a threshold distance below, or rises more than the threshold distance above, 1.0, a fourth phase is entered in which subsequently received data points 2216 continue to be compressed and stored 2217 but are also stored without compression in a separate container 2218. This dual storage continues until a sufficient number of new data points have been received to undertake a new parameter determination 2219, during a fifth phase 2220. Once the new parameter determination is finished, subsequently received data points 2221 are compressed according to the new parameter values, during a sixth phase, while the data points compressed according to the previous parameter values 2222 and 2223 are combined to generate a container 2224 containing compressed data points. Phase 6 continues until the ratio of outlier data points to inlier data points increases above a threshold value, or until the ratio of the number of outlier data points below the lower threshold to the number of outlier data points above the higher threshold falls over a threshold distance below or rises more than the threshold distance above 1.0, at which point the subsystem transitions again to phase four. This process produces a series of containers containing compressed data points for a metric-data set. Of course, the process can be concurrently carried out for multiple metric-data sets by a data collection, compression, and storage subsystem. Note that, during continuous compression, the different classes of compressed data points are stored in separate containers or sub-containers 2226-2228. These separate containers or sub-containers are easily combined to produce compressed metric data according to the format illustrated in diagrams 1660 in FIGS. 16 and 1910 in FIG. 19.

Figure 22B:
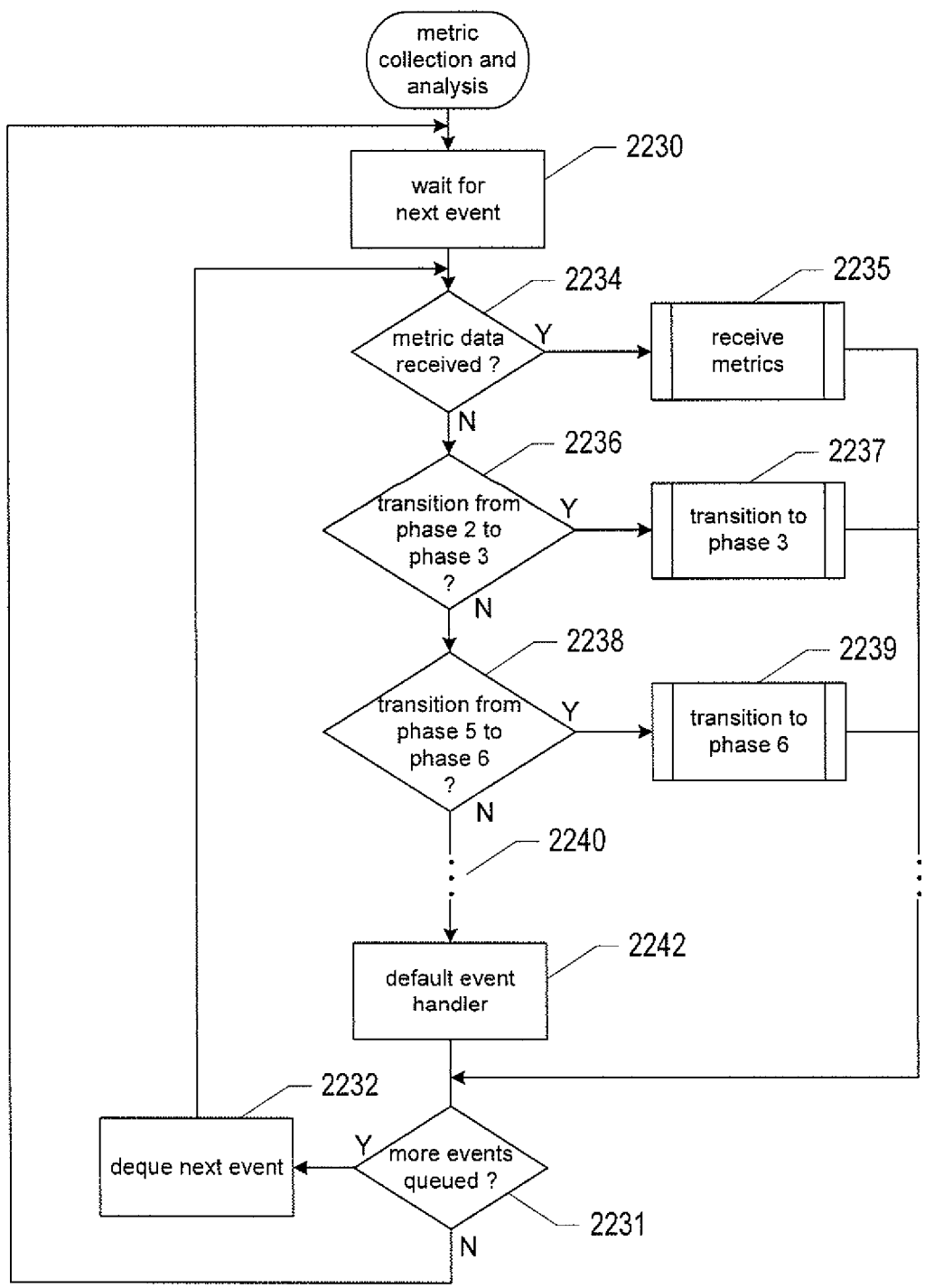

FIG. 22B illustrates an event-handling loop within the metric-data collection-and-storage subsystem. The metric-data collection-and-storage subsystem continuously waits for a next event to occur, in step 2230 and, when a next event occurs, carries out a determination of the event type in order to handle the event. Once the event has been handled, and when there are more events queued for handling, as determined in step 2231, a next event is dequeued, in step 2232, and the event handling process continues. Otherwise, control flows to step 2230 where the metric-data collection-and-storage subsystem waits for a next event. When the currently considered event is a metric-data-received event, as determined in step 2234, a "receive metrics" handler is called, in step 2235, to handle reception of the metric data. When the next occurring event is a phase-2-to-phase-3 transition event, as determined in step 2236, a "transition to phase 3" handler is called, in step 2237. When the currently considered event is a transition-from-phase-5-to-phase-6 event, as determined in step 2238, a "transition to phase 6" handler is called, in step 2239. Ellipses 2240 indicate that many different additional types of events are handled by the event loop illustrated in FIG. 22B. A default handler 2242 handles rare and unexpected events.

Figure 22C:
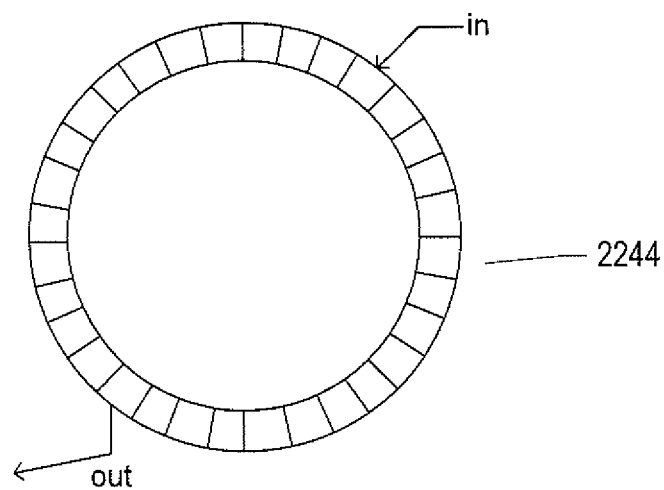

FIG. 22C illustrates various parameters, variables, and data structures employed in the subsequently described implementation of the "receive metrics" handler called in step 2235 of FIG. 22B. Received metric data is initially stored in a circular buffer 2244 within the metric-data collection-and-storage subsystem, and a "metric data received" event is generated when new metric data is queued to the queue. The parameter n 2245 specifies the number of quantization intervals. The sizes of the stored timestamps 2246, uncompressed metric-data values 2247, and integers 2248, and compressed metric-data values, or quantization-interval identifiers 2249 together specify the number of bytes or bits used for storing compressed metric data. The parameters $c_0, c_1, \ldots, c_n$ specify the quantization thresholds 2250 and the parameters $m_1, m_2, \ldots, m_n$ specify the representative metric-data-values for each of the quantization intervals 2252. The variables L, H, and Q store the number of outliers below the lower threshold, the number of outliers above the higher threshold, and the number of inlier data points added to the compressed metric data 2253. The variable numEntries 2254 stores an indication of the number of data points that have been received for compression and storage. The variable phase 2255 indicates the current phase of metric-data reception, compression, and storage, discussed above with reference to FIG. 22A. The array Files 2256 contains file pointers for various containers currently being used to store uncompressed and compressed data points. The integers aFile, bFile, cFile, . . . 2257 are indexed into the Files array. The variable last_d 2258 stores an indication of the last quantization interval stored in a compressed inlier data point.

Figure 22D:
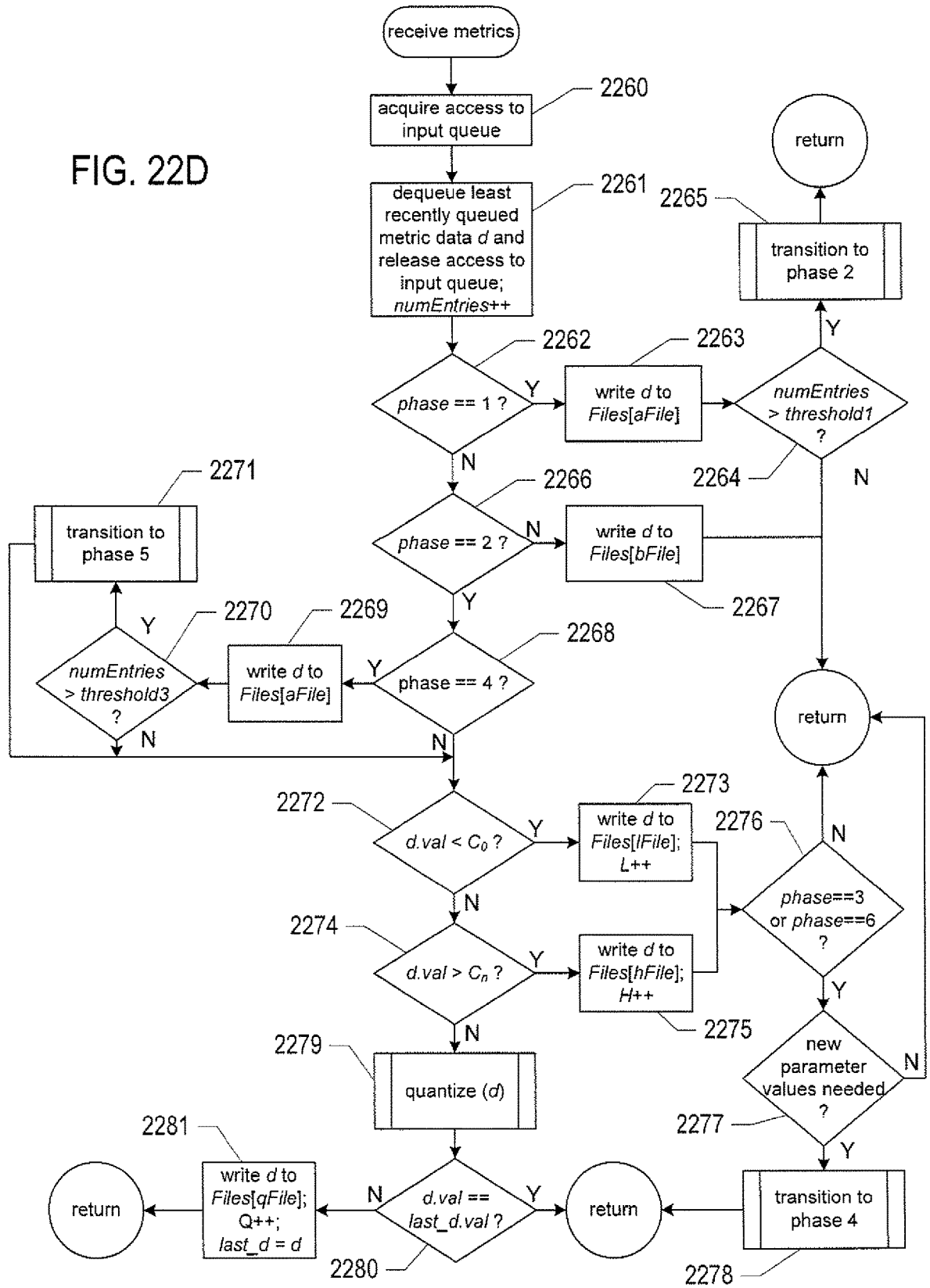

FIG. 22D provides a control-flow diagram for the handler "receive metrics," called in step 2235 of FIG. 22B. In step 2260, the handler "receive metrics" acquires access to the input queue (2244 in FIG. 22C). This may involve a semaphore operation or other such operation that provides exclusive access to the input queue pointers. In step 2261, the routine "receive metrics" dequeues the least recently queued metric data d from the input queue, releases access to the input queue to enable subsequently received metric data to be queued to the input queue, and increments the variable numEntries. When the current phase is phase 1, as determined in step 2262, then, in step 2263, the received metric data d is written, without compression, to a current container (2204 in FIG. 22A). When the number of entries has increased above a threshold value, as determined in step 2264, a call is made, in step 2265, to an "initiate transition to phase 2" routine, which undertakes a parameter-value determination based on the initially stored metric data, as discussed above with reference to FIG. 22A. Otherwise, the handler "receive metrics" returns. When the current phase is phase 2, as determined in step 2266, then, in step 2267, the received metric data d is written, without compression, to a current container (2206 in FIG. 22A) and the handler "receive metrics" returns. When the current phase is phase 4, as determined in step 2268, then, in step 2269, the received metric data d is written, without compression, to a current container (2218 in FIG. 22A) and, when the number of received data points exceeds a threshold value, as determined in step 2270, a call is made, in step 2271, to a "transition to phase 5" routine, which undertakes a new parameter-value determination based on recently stored, uncompressed, metric data. When the metric-data value at the time point is less than the lower threshold, as determined in step 2272, the data point is written, in uncompressed form, to the container or sub-container to which outlier data points below the lower threshold are written, in step 2273, and the variable L is incremented. Similarly, when the metric-data value of the data point is greater than the higher threshold value, determined in step 2274, the data point is written to the container or sub-container to which outlier data points with metric-data values above the higher threshold are written, in step 2275, and the variable H is incremented. After writing the outlier data point to the appropriate container or sub-container, when the current phase is phase 3 or phase 6, as determined in step 2276, and when new parameter values are needed, as determined in step 2277, a call is made to a "transition-2-phase 4" routine, in step 2278 to return to phase 4 in order to undertake new parameter-values determination. In the current phase is not phase 3 or phase 6, or after the call to the "transition-2-phase 4" routine, the handler "receive metrics" returns. When the currently considered data point is an inlier data point, the routine "quantize" is called, in step 2279, to replace the metric-data value with a representative metric-data value for the quantization-interval in which the currently considered data point resides. When the representative metric-data value is equal to the last representative metric-data value observed, as determined in step 2280, the routine "receive metrics" returns, since the currently disclosed compression method eliminates adjacent compressed data points in a common quantization interval, as discussed above with reference to FIGS. 14-21. Otherwise, the quantized data point is written to the container or sub-container to which inlier data points are written. In step 2781, the variable Q is incremented, and the variable last_d is set to the currently considered data point. New parameter values are needed, as determined in step 2277, when, as discussed above, the ratio of lower-threshold outlier data points to higher-threshold outlier data points depart significantly from the value 1.0 or when the ratio of the total number of outlier data points to the number of inlier data points rises above a threshold value. Other types of considerations may also factor into the decision, in alternative implementations. It is assumed that arguments are passed by reference when a routine modifies the argument values for use by the calling routine and when a large data structure, such as an array, is passed as an argument.

Figure 22E:
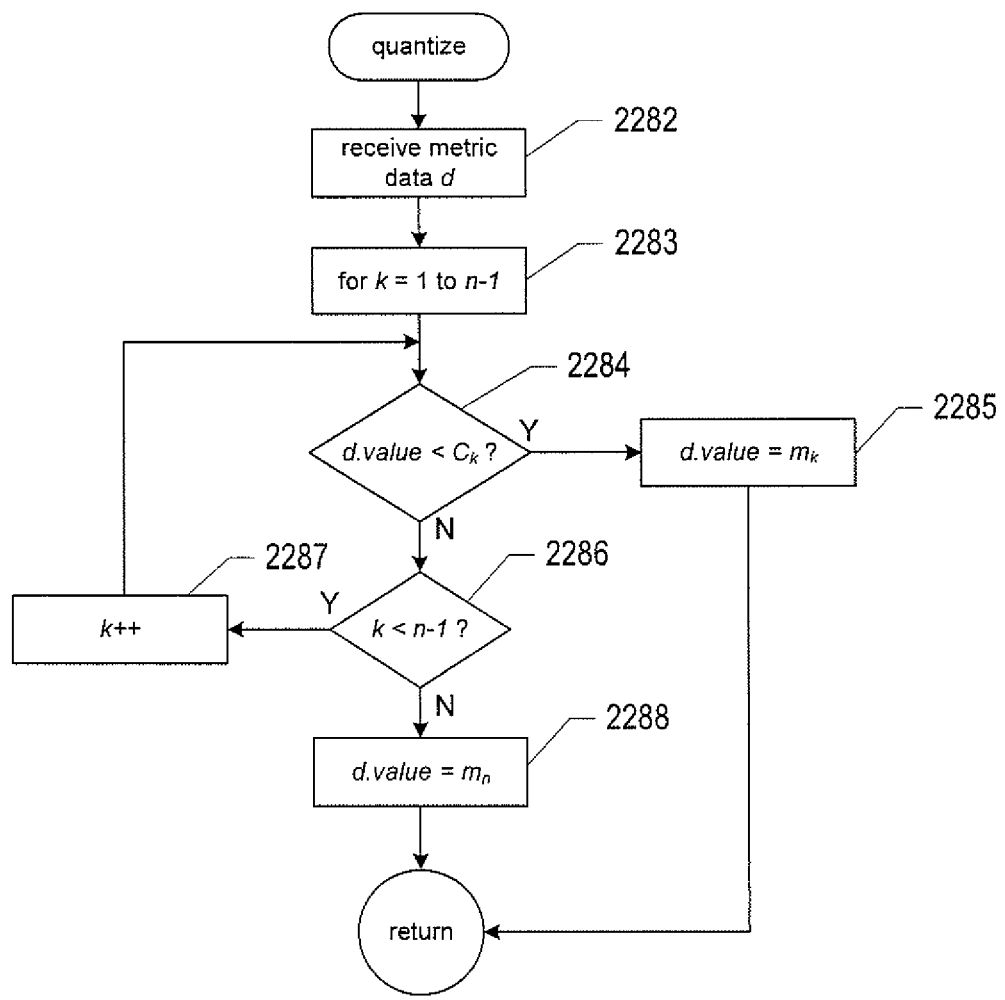

FIG. 22E provides a control-flow diagram for the routine "quantize," called in step 2279 of FIG. 22D. In step 2282, the routine "quantize" receives a data point d. In the for-loop of steps 2283-2287, the routine "quantize" successively compares the metric-data value in the received data point d to the quantization thresholds until the quantization interval to which the data point belongs is found. When the appropriate quantization interval is found, the metric-data value of the data point d is replaced with a representative metric-data value for the determined quantization interval, in either step 2285 or step 2288.

Figure 23A:
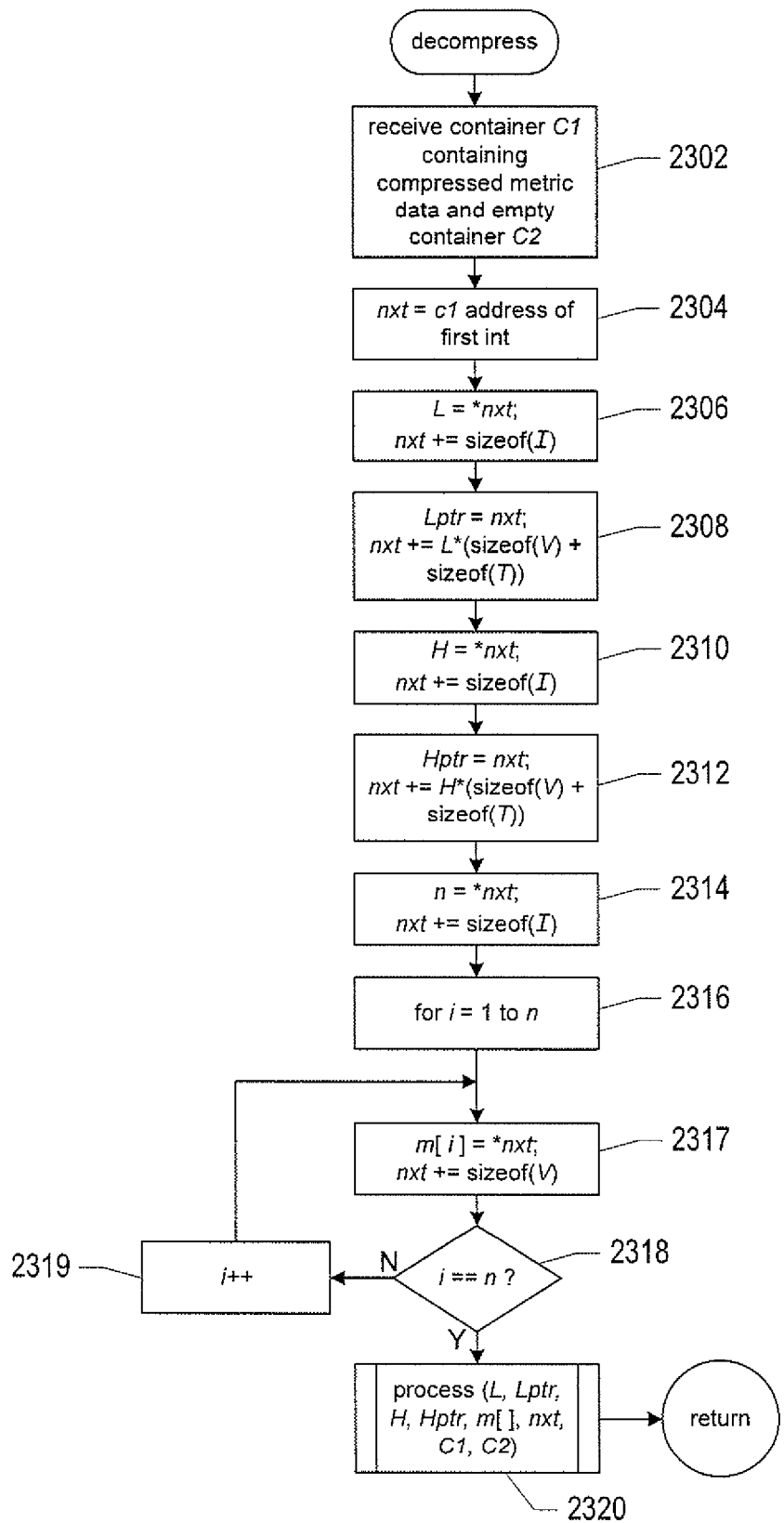
FIGS. 23A-C provides a control-flow diagrams that illustrate the method for decompressing metric data compressed by the currently disclosed metric-data-compression method.
Figure 23B:
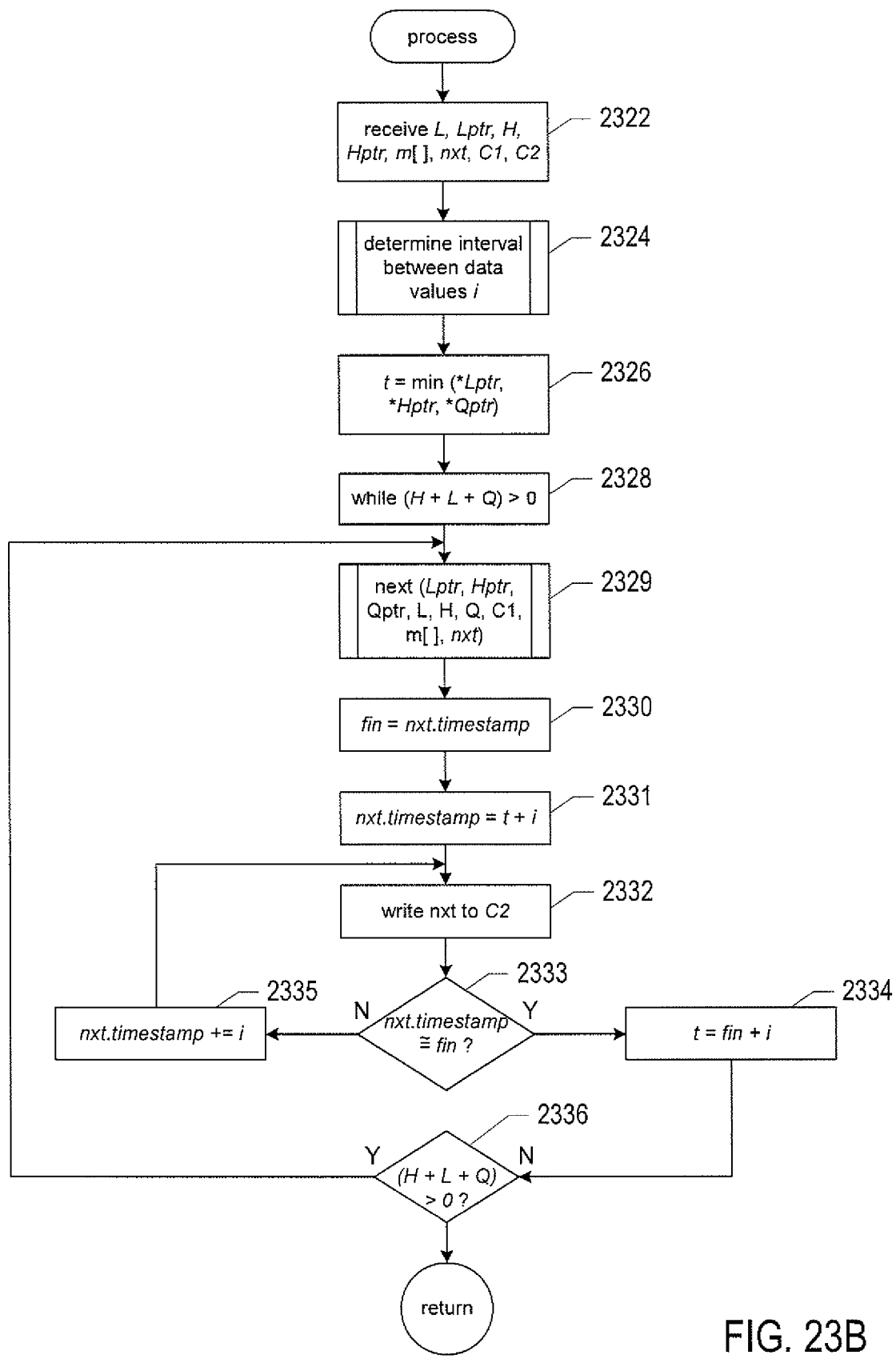
Figure 23C:
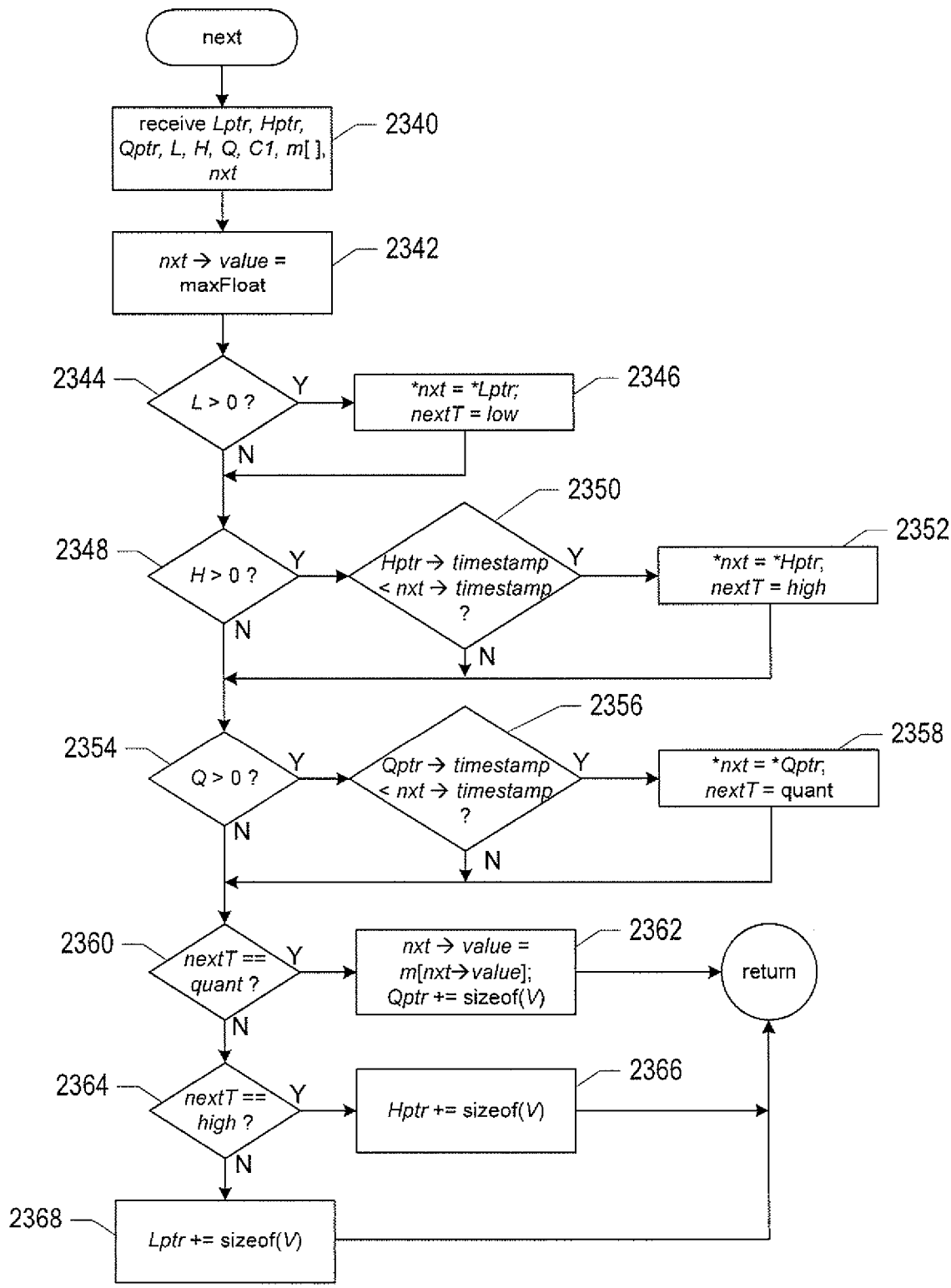

FIGS. 23A-C provides a control-flow diagrams that illustrate the method for decompressing metric data compressed by the currently disclosed metric-data-compression method. FIG. 23 a provides a control-flow diagram for the routine "decompress." In step 2302, the routine "decompress" receives a reference to container C1 containing compressed metric data and an empty container C2 into which decompress data is written. In step 2304, the routine "decompress" sets a reference next to the file address of the first integer in the C1 container. Note that, for simplicity of illustration, the contents of the containers are referenced using pointers similar to referencing of memory locations by pointers. In step 2306, the variable L is set to the contents of the first integer, which indicates the number of lower-threshold outliers contained in the compressed data, and the reference next is appropriately incremented. In step 2308, the pointer variable Lptr is set to the value of the pointer variable nxt and the variable nxt is incremented past the uncompressed lower-threshold outliers to reference the second integer. In step 2310, the variable H is set to the value of the second integer in the compressed data in the variable nxt is appropriately incremented. The variable H contains the number of higher-threshold outliers in the compressed data. In step 2312, the pointer variable Hptr is set to the value stored in the variable nxt and the variable nxt is incremented past the higher-threshold outliers to the third integer in the compressed data. In step 2314, the number of quantization intervals n is extracted from the compressed data via the variable nxt and the variable nxt is appropriately incremented. In the for-loop of steps 2316-2319, the representative metric-data values for the n quantization intervals are extracted and stored in the array m[ ]. Finally, in step 2320, the routine "process" is called to decompress the compressed data points and insert decompressed outlier data points into the container C2.

FIG. 23B provides a control-flow diagram for the routine "process," called in step 2320 of FIG. 23A. In step 2322, the routine "process" receives the parameters L, Lptr, H, Hptr, nxt, C1, C2, and m[ ]. In step 2324, the routine "process" determines the time interval i between data values in the compressed metric-data set. This determination can be made by scanning through the inlier-data-point representations to find the smallest consistent interval between two data points. In step 2326, the variable t is set to the minimum timestamp value in the 3 data partitions that include the 2 outlier partitions and the inlier partition minus the time interval i. In the while-loop of steps 2328-2335, uncompressed and compressed data points are extracted from the compressed-data container C1 and written to the decompressed data container C2. The while-loop continues until the sum of the remaining number of outlier data points and inlier data points falls to 0. In step 2329, a routine "next" is called to retrieve a next decompressed data point. In step 2330, the variable fin is set to the value of the timestamp in the next decompressed data point retrieved by the routine "next." In step 2331, the timestamp data point is set to the expected value t+i. Then, in step 2332, the next decompressed data point is written to the container C2. When the current timestamp value associated with the next data point is approximately equal to the contents of the variable fin, as determined in step 2333, then, in step 2334, the variable t is set to fin+i and the while-loop of steps 2328-2335 terminates. Otherwise, the current timestamp in the next decompressed data point is incremented by i, in step 2335, and control returns to step 2332 to write a next data point that had been eliminated in the compressed data. When there is at least one remaining outlier or inlier data point in the compressed container, as determined in step 2336, control returns to step 2329 for a next iteration of the while-loop of steps 2228-2336. Otherwise, the routine "process" returns.

FIG. 23C provides a control-flow diagram for the routine "next," called in step 2329 of FIG. 23B. In step 2340, the routine "next" receives the arguments Lptr, Hptr, Hptr, L, H, Q, C1, m[ ], and nxt. In step 2342, the routine "next" sets the metric-data value for the data point referenced by nxt to a large floating-point value. When there is another lower-threshold outlier data point to extract from the compressed data, as determined in step 2344, the contents of the data point referenced by nxt is set to that outlier data point and the variable nextT is set to "low," in step 2346. When there is another higher-threshold outlier to extract from the compressed data, as determined in step 2348, and when the timestamp associated with the next higher-threshold outlier is less than the timestamp associated with the data point referenced by the variable nxt, as determined in step 2350, the contents of the data point referenced by nxt is set to the higher-threshold outlier, in step 2352 and the variable nextT is set to "high." When there is a remaining inlier data point in the compressed data, as determined in step 2354, and when a timestamp associated with that data point is less than the timestamp associated with the data point referenced by nxt, as determined in step 2356, the contents the data point referenced by nxt is set to the next inlier data point in the compressed data, in step 2358, and the variable nextT is set to "quant." When the variable nextT stores the value "quant," as determined in step 2360, the metric-data value for the data point referenced by nxt is set to the representative metric-data-value for the quantization interval of the compressed data point to generate a decompressed data point, in step 2362. Otherwise, when the value of the variable nextT is "high," as determined in step 2364, the variable Hptr is appropriately incremented, in step 2366. Otherwise the variable Lptr is appropriately incremented, in step 2668.

The present invention has been described in terms of particular embodiments, it is not intended that the invention be limited to these embodiments. Modifications within the spirit of the invention will be apparent to those skilled in the art. For example, any of many different implementation and design parameters, including choice of operating system, virtualization layer, hardware platform, programming language, modular organization, control structures, data structures, and other such design and implementation parameters can be varied to generate a variety of alternative implementations of the current disclosed methods and systems. In alternative implementations, different formats for compressed metric-data containers may be used, including formats that place the various counts of data points and the representative metric-data values for quantization intervals into a header. Decompressed metric data can be used in a large variety of analytical and monitoring subsystems that monitor the operational status of a large data center or distributed computing system and that carry out automated remedial actions to address detected problems and anomalies.

The invention claimed is:

1. A metric-data storage subsystem within a distributed computer system, the metric-data collection-and-storage subsystem comprising:
   one or more processors;
   one or more memories;
   one or more data-storage devices;
   one or more virtual machines instantiated by computer instructions stored in one or more of the one or more memories and executed by one or more of the one or more processors that together decompress stored metric data by
      receiving a reference to a container containing compressed metric data points,
      extracting compression parameters from the container, and
      while unextracted metric data points remain in the container,
         determining a next time in a time sequence of metric data points generated by decompressing the stored metric data,
         when an unextracted outlier metric data point corresponds to the next time,
            extracting the outlier metric data point, and
            appending the extracted metric data point to the time sequence of metric data points,
         when an unextracted compressed inlier metric data point corresponds to the next time,
            extracting the compressed inlier metric data point,
            decompressing the compressed inlier metric data point, and
            appending the decompressing the inlier metric data point to the time sequence of metric data points, and
         when no unextracted inlier metric data point corresponds to the next time, appending a copy of the most recently decompressed inlier metric data point to the time sequence of metric data points.

2. The metric-data storage subsystem of claim 1 wherein each received metric data point is representable as a timestamp/metric-data-value pair.

3. The metric-data storage subsystem of claim 2 wherein outlier metric data points include:
   lower-threshold-outlier metric data points with metric-data values less than a lowest-valued quantization threshold metric-data value; and
   higher-threshold-outlier metric data points with metric-data values greater than a highest-valued quantization threshold metric-data value.

4. The metric-data storage subsystem of claim 3 wherein the extracted compression parameters include:
   a number n that indicates a number of representative quantization-interval metric-data values;
   the representative quantization-interval metric-data values;
   an indication of a number of lower-threshold-outlier metric data points;
   an indication of a number of higher-threshold-outlier metric data points; and
   an indication of a number of stored inlier metric data points.

5. The metric-data storage subsystem of claim 3 wherein decompressing a compressed inlier metric data point comprises:
   using a quantization-interval identifier included in the compressed inlier metric data point to replace the quantization-interval identifier with a corresponding representative quantization-interval metric-data value for the quantization interval identified by the quantization-interval identifier.

* * * * *